(12) United States Patent
Ehle et al.

(10) Patent No.: US 11,470,779 B2
(45) Date of Patent: Oct. 18, 2022

(54) GATHERING CHAINS FOR ROW CROP HARVESTER HEADS

(71) Applicant: 360 Yield Center, LLC, Morton, IL (US)

(72) Inventors: Austin Ehle, Mount Pulaski, IL (US); Tyler Ritland, Tremont, IL (US); Jesse Kaiser, Tremont, IL (US)

(73) Assignee: 360 Yield Center, LLC, Morton, IL (US)

( * ) Notice: Subject to any disclaimer, the term of this patent is extended or adjusted under 35 U.S.C. 154(b) by 463 days.

(21) Appl. No.: 15/751,862

(22) PCT Filed: Aug. 8, 2016

(86) PCT No.: PCT/US2016/046086
§ 371 (c)(1),
(2) Date: Feb. 10, 2018

(87) PCT Pub. No.: WO2017/027486
PCT Pub. Date: Feb. 16, 2017

(65) Prior Publication Data
US 2018/0235148 A1  Aug. 23, 2018

Related U.S. Application Data

(60) Provisional application No. 62/353,018, filed on Jun. 21, 2016, provisional application No. 62/203,232, filed on Aug. 10, 2015.

(51) Int. Cl.
*A01D 45/02* (2006.01)
*A01D 47/00* (2006.01)

(52) U.S. Cl.
CPC ............ *A01D 45/023* (2013.01); *A01D 47/00* (2013.01)

(58) Field of Classification Search
CPC ...... A01D 45/023; A01D 47/00; A01D 57/22; A01D 61/02; A01D 61/04; B65G 15/12;
(Continued)

(56) References Cited

U.S. PATENT DOCUMENTS 1,671,924 A * 5/1928 Brogden .................. A23B 7/16
426/305
1,727,021 A * 9/1929 Van Nortwick ..... A01D 45/021
56/104

(Continued)

FOREIGN PATENT DOCUMENTS

DE    3300826 A1 * 7/1984 ........... A01D 45/023
DE    8814148 U1    7/1989
(Continued)

OTHER PUBLICATIONS

English Translation of German Patent DE 3300826 A1 to Purrer, Josef, Jul. 12, 1984, European Patent Office website. (Year: 2020).*
(Continued)

*Primary Examiner* — Thomas B Will
*Assistant Examiner* — Joan D Misa
(74) *Attorney, Agent, or Firm* — Larkin Hoffman Daly and Lindgren, Ltd.

(57) ABSTRACT

Gathering chains for row crop harvester heads which improve yield by minimizing the loss of kernels that may prematurely break loose and be lost to the ground. The gathering chains include continuous loops with a plurality of lateral extension segments which provide a substantially continuous conveying surface extending substantially across the width of the slot defining the path of travel of the row crop entering the row unit.

7 Claims, 25 Drawing Sheets

(58) Field of Classification Search
CPC ........ B65G 15/14; B65G 15/24; B65G 17/06; B65G 15/18; B65G 15/42; B65G 15/44
See application file for complete search history.

(56) References Cited

U.S. PATENT DOCUMENTS

| | | | | |
|---|---|---|---|---|
| 1,922,374 A * | 8/1933 | Krause | A01D 45/02 | 56/13.3 |
| 1,925,605 A * | 9/1933 | Roberts | A23N 12/02 | 15/3.15 |
| 2,276,978 A * | 3/1942 | Hyman | B65G 17/42 | 198/711 |
| 2,527,938 A * | 10/1950 | Korra | B65G 17/06 | 198/730 |
| 2,778,086 A * | 1/1957 | Wilcox | B28B 11/0818 | 425/325 |
| 2,809,743 A * | 10/1957 | Hinchcliffe | B65G 15/42 | 198/699 |
| 2,882,669 A * | 4/1959 | Jones | A01D 45/023 | 56/111 |
| 2,959,272 A * | 11/1960 | Jones | A01D 45/023 | 198/693 |
| 3,035,387 A * | 5/1962 | Bevill | A01D 46/08 | 56/28 |
| 3,147,850 A * | 9/1964 | Ronceray | B65G 15/44 | 198/801 |
| 3,260,041 A * | 7/1966 | Mcroberts | A01D 45/22 | 56/119 |
| 3,538,694 A * | 11/1970 | Holloway | A01D 46/28 | 56/330 |
| 3,580,388 A * | 5/1971 | Resener | B65G 15/42 | 198/690.2 |
| 3,587,216 A * | 6/1971 | Camarillo et al. | A01D 45/00 | 56/327.1 |
| 3,601,965 A * | 8/1971 | Kaessbohrer | A01D 46/28 | 56/329 |
| 3,613,343 A * | 10/1971 | McRoberts et al. | A01D 46/28 | 56/330 |
| 3,736,734 A | 6/1973 | Pavel | | |
| 3,772,866 A * | 11/1973 | Sell | A01D 46/28 | 56/330 |
| 3,808,783 A * | 5/1974 | Sutherland | A01D 45/021 | 56/106 |
| 3,854,272 A * | 12/1974 | Lane, III | A01D 43/083 | 56/98 |
| 3,857,478 A * | 12/1974 | Meeusen | B65G 17/12 | 198/690.2 |
| 3,894,382 A * | 7/1975 | Jauss | A01D 45/021 | 56/14.3 |
| 3,896,611 A * | 7/1975 | Lingenfelter | A01D 45/023 | 56/119 |
| 3,940,913 A * | 3/1976 | Wallenfang | A01D 43/082 | 56/98 |
| 3,981,390 A * | 9/1976 | Richard | A01D 34/831 | 198/690.2 |
| 4,072,062 A * | 2/1978 | Morling | A01D 45/023 | 198/494 |
| 4,143,504 A * | 3/1979 | Noack | A01D 45/023 | 56/111 |
| 4,266,394 A * | 5/1981 | VanGinhoven | A01D 57/22 | 56/119 |
| 5,058,369 A | 10/1991 | Garner | | |
| 5,287,687 A * | 2/1994 | Urich | A01D 46/00 | 56/327.1 |
| 5,478,277 A * | 12/1995 | Kloefkorn | A01D 61/008 | 460/114 |
| 5,878,561 A * | 3/1999 | Gunn | A01D 45/023 | 56/119 |
| 5,878,866 A * | 3/1999 | Lisec | B65G 49/064 | 198/496 |
| 5,881,541 A * | 3/1999 | Silver | A01D 45/023 | 56/119 |
| 5,911,673 A * | 6/1999 | Johnson | A01D 45/021 | 56/111 |
| 5,924,269 A | 7/1999 | Mcmillen | | |
| 6,230,476 B1 * | 5/2001 | Carr | A01D 43/083 | 56/14.3 |
| 6,237,312 B1 * | 5/2001 | Becker | A01D 45/021 | 56/119 |
| 6,516,599 B1 * | 2/2003 | Clarke | A01D 45/023 | 56/111 |
| 7,484,348 B2 * | 2/2009 | Bich | A01D 45/023 | 56/93 |
| 7,805,916 B2 * | 10/2010 | Hinds | A01D 47/00 | 56/62 |
| 7,874,134 B1 * | 1/2011 | Hoffman | A01D 45/023 | 56/119 |
| 7,913,480 B2 * | 3/2011 | Christensen | A01D 45/021 | 56/119 |
| 8,857,139 B1 * | 10/2014 | Calmer | A01D 45/023 | 56/106 |
| 8,863,487 B2 * | 10/2014 | Calmer | A01D 45/025 | 56/106 |
| 8,888,625 B2 * | 11/2014 | Lehman | A01D 45/023 | 474/117 |
| 9,961,830 B2 * | 5/2018 | Gengerke | A01D 45/021 | |
| 10,039,228 B2 * | 8/2018 | Walker | A01D 45/021 | |
| 10,625,944 B2 * | 4/2020 | Shakushiro | B65G 15/44 | |
| 10,716,257 B2 * | 7/2020 | Walker | A01D 43/083 | |
| 2010/0186363 A1 | 7/2010 | Hinds et al. | | |
| 2011/0011048 A1 | 1/2011 | Hoffman | | |
| 2011/0167778 A1 * | 7/2011 | Sidhu | A01D 46/28 | 56/329 |
| 2019/0141894 A1 * | 5/2019 | Feuerborn | A01D 45/021 | 56/105 |

FOREIGN PATENT DOCUMENTS

| | | | | |
|---|---|---|---|---|
| DE | 4106475 A1 | 3/1992 | | |
| EP | 2954771 B1 * | 8/2017 | | A01D 61/04 |
| WO | WO-2006100733 A1 * | 9/2006 | | A01D 57/22 |
| WO | WO-2014076450 A1 * | 5/2014 | | B65G 15/14 |
| WO | WO-2015085161 A1 * | 6/2015 | | A01F 12/46 |

OTHER PUBLICATIONS

Mink Kett-System—the ideal solution for transverse cleaning and conveyance. Informational Material [online]. Mink Bursten, Sep. 2019 [retrieved on Jun. 13, 2021], Retrieved from the Internet: <URL: https://www.mink-buersten.com/uploads/tx_userminkinfomaterial/Kett_System_D_GB_F_01.pdf>. (Year: 2019).*

Screen captures from Bing Image search result from text search "Mink Kett System", 10 pages, uploaded on Mar. 20, 2013 by Mink-Buersten.com. Retrieved from the Internet: <https://www.bing.com/images/feed?form=Z9LH> on Aug. 15, 2022. (Year: 2022).*

International Search Report and Written Opinion from the ISA/US; PCT Application No. PCT/US2016/046086; dated Oct. 27, 2016, 10 pages.

Extended European Search Report from the European Patent Office; EP Application No. 16835772.1, dated Mar. 25, 2019, 7 pages.

* cited by examiner

GATHERING CHAINS FOR ROW CROP HARVESTER HEADS

BACKGROUND

Modern conventional agricultural combine harvesters or "combines" utilize removable and interchangeable attachments called "headers" or "heads" which are adapted for harvesting different types of crops. An example of a conventional combine 10 is shown in FIGS. 1-3 having a conventional head 20 attached for harvesting row crops, such as corn. For convenience, and by way of example when referring to row crop heads for harvesting corn, the row crop head 20 may be referred to as a "corn head" for simplicity. Row crop heads 20 include a plurality of conical shaped crop dividers 22 which extend forwardly and diverge rearwardly. Row unit assemblies 30 are disposed between the adjacent dividers where the rearwardly diverging dividers 22 nearly converge. In FIG. 1, the row crop head or corn head 20 is illustrated with twelve row unit assemblies 30 (e.g., a 12-row corn head) but it should be understood that row crop heads such as corn heads typically range from four rows to twenty-four rows or more.

As illustrated in FIG. 3, during corn harvesting operations, the corn head 20 is positioned with the dividers 22 positioned between adjacent corn rows 12 and below the ears 14 on the cornstalks 16. It should be appreciated that as the combine 10 drives forwardly through the field as indicated by the arrow 18 in FIG. 2, the conical, rearwardly diverging shape of the dividers 22 cause the cornstalks 16 within each row 12 to be guided and directed into the row unit assemblies 30 between the adjacent dividers 22. As explained in more detail below, the row unit assemblies 30 separate the ears 14 from the cornstalks 16 and convey the separated ears toward the trough 23 and cross-auger 24. The cross-auger 24 augers the separated ears 14 within the trough 23 toward the opening 27 of the feederhouse 26 in the middle of the corn header 20. The feederhouse 26 conveys the ears 14 into the interior of the combine where the corn kernels are separated from remaining portions of the cornstalks, husks and corncob. Within the combine, the separated kernels pass over a series of screens which separates unwanted crop material and other residue from the kernels. The clean grain is then carried by elevators to a clean grain holding tank while the corncobs, leaves, husks and cornstalks which entered the combine are chopped and discharged through the rear of the combine and mix with the cornstalks that pass under the combine.

Referring to FIGS. 4-6, each row unit 30 includes a pair of gathering chains 32, 34 with outwardly extending lugs 36. The gathering chains 32, 34 are continuous loops that extend around drive sprockets 38 and idler sprockets 39 (FIG. 5). Rotation of the drive sprockets 38 causes the gathering chains 32, 34 to rotate in adjacent parallel paths such that as the combine 10 drives forwardly through the field, the outwardly extending lugs 36 draw the cornstalks 16 into the row unit 30. Below the rotating gathering chains is a pair of spaced stripper plates 40, 42. The stripper plates 40, 42 are spaced sufficiently apart to define a slot 44 between them which defines a longitudinal path of travel 111 along which corn stalks pass as the row unit moves forwardly through a corn field harvesting corn. The slot 44 is sufficiently wide to permit the corn stalks 16 to enter but which is sufficiently narrow so that the corn ears 14 cannot pass through. A pair of rapidly rotating stalk rolls 50, 52 are positioned below stripper plates 40, 42.

As best illustrated in FIG. 6, during harvesting operations, the rotating stalk rolls 50, 52 rapidly pull the corn stalks 16 downwardly through the slot 44 between the stripper plates 40, 42 such that when the corn ears 14 engage the stripper plates 40, 42, the ears 14 are pulled or stripped from the cornstalks 16. As the stalk rolls 50, 52 rotate, the cornstalk 16 is pulled downwardly through the slot 44 and is returned to the field below the header 20 as the combine drives forwardly (FIG. 2). The stripped ears 14 which remain on the stripper plates 40, 42 after the cornstalk 16 is pulled through the slot 44 are then conveyed by the lugs 36 of the gathering chains 32, 34 upwardly and rearwardly to the trough 23 and cross-auger 24. The cross-auger 24 augers the ears 14 within the trough to the feederhouse 26, and the feederhouse 26 feeds the ears 14 into the interior of the combine for shelling and separating the kernels from the corncob as is known in the art.

It should be appreciated that the action of the stalks being pulled and thrashed around by the stalk rolls and gathering chains will often cause the stalks to break such that the ears of corn fall and impact against the dividers. When the ears impact the dividers or are stripped by the stripper plates, individual kernels will often break loose from the corncob and fall through the slot 44 between the stripper plates to the ground. Every lost kernel reduces the farmers yield and potential profits. Therefore, there is a need in the art for a gathering chain that minimizes the loss of kernels that may prematurely break loose and be lost to the ground reducing yields.

DESCRIPTION

Figure 1:
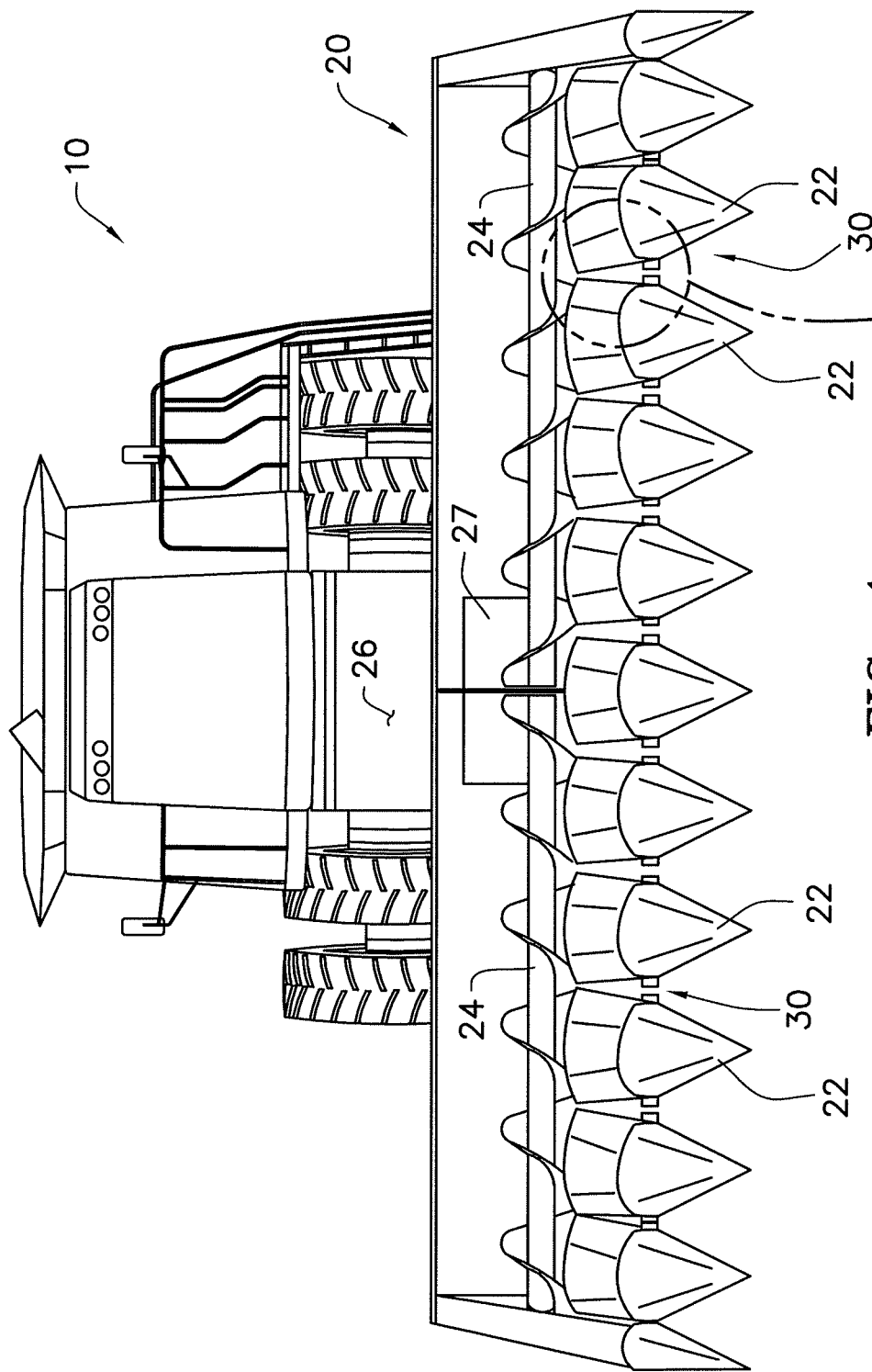
FIG. 1 is a front elevation view of an embodiment of a modern conventional agricultural combine harvester with a cornhead attachment.
Figure 2:
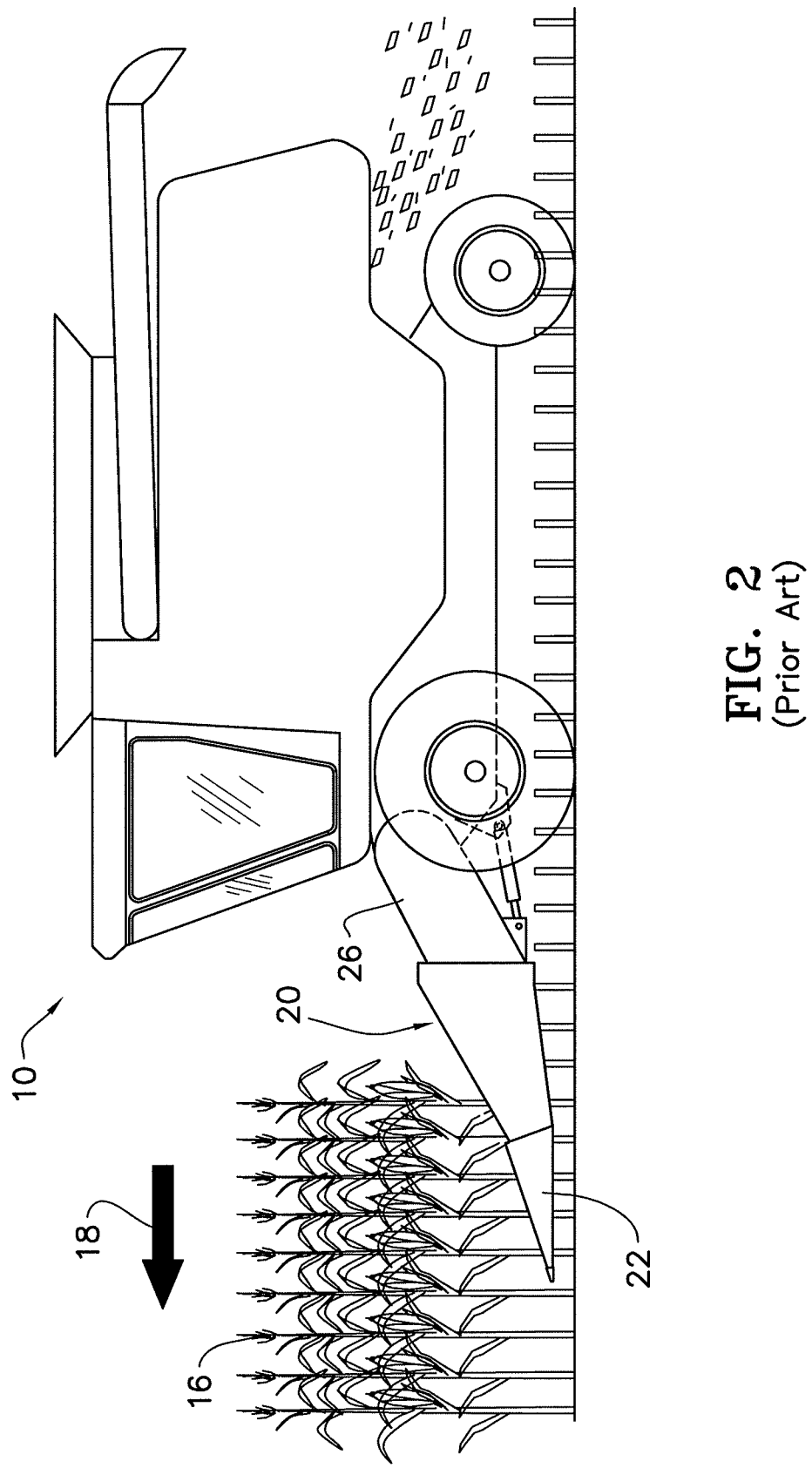
FIG. 2 is a side elevation view of the combine harvester and cornhead of FIG. 1.
Figure 3:
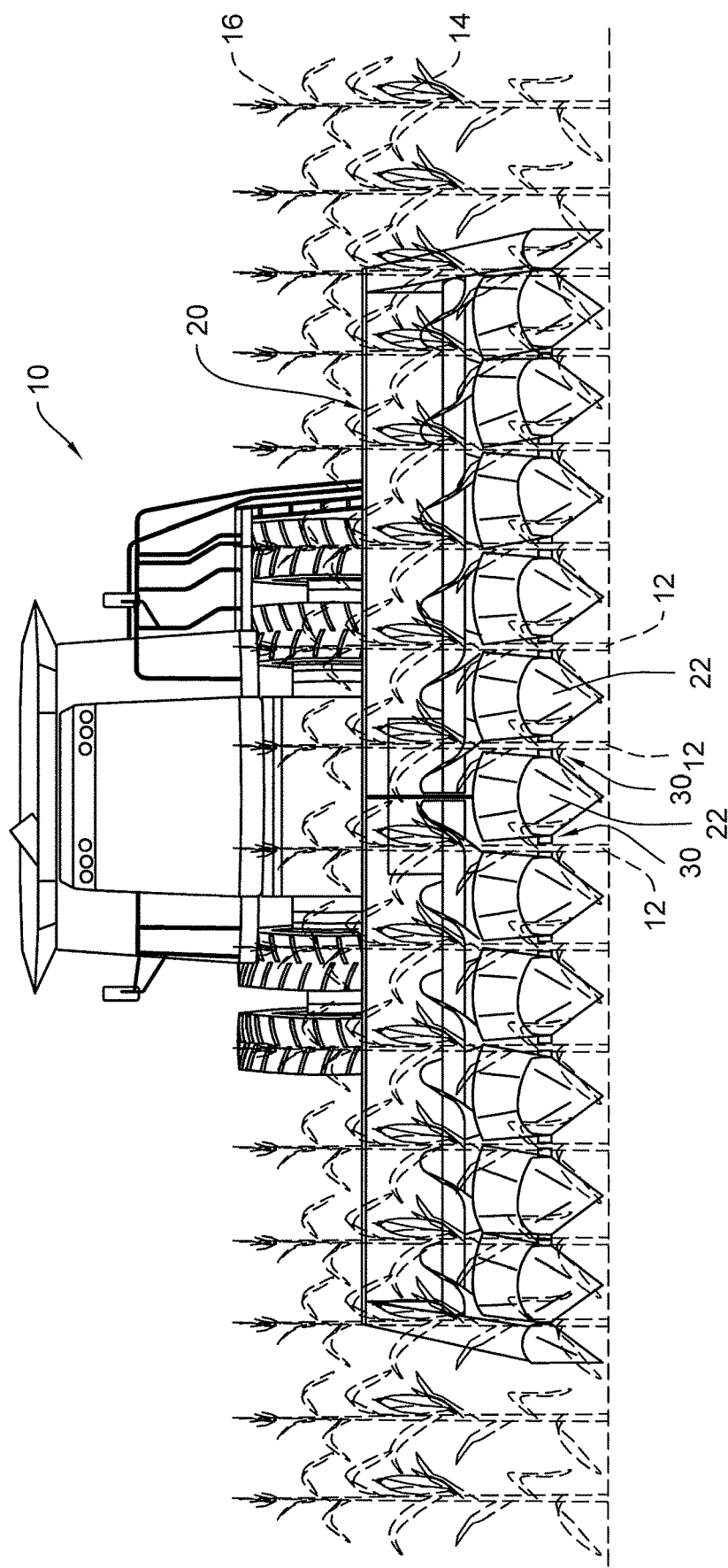
FIG. 3 is the same front elevation view of the combine harvester and cornhead of FIG. 1, but shown in a cornfield in harvesting position.
Figure 4:
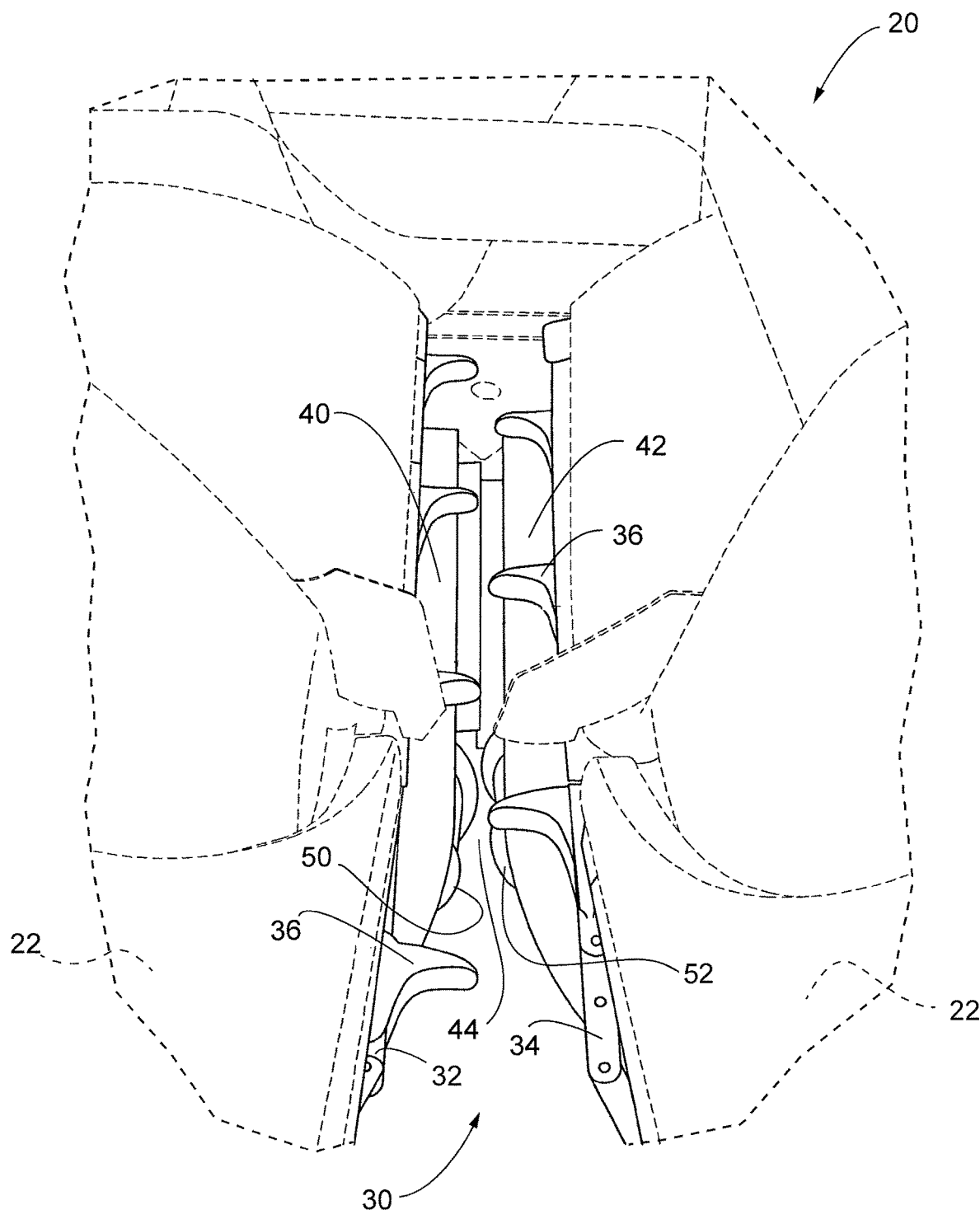
FIG. 4 is an enlarged view of the portion of the row unit assembly circled in FIG. 1 showing parts of the row unit assembly between the crop divider points.

Referring now to the drawing figures wherein like reference numerals designate the same or corresponding components throughout the several figures, the present disclosure is generally directed toward a substantially continuous conveying surface designated generally across all the various embodiments illustrated in FIGS. 7-25 by reference numeral 100. In each of the various embodiments, the substantially continuous conveying surface 100 is achieved by a series of lateral extensions designated generally by reference numeral 200 which extend laterally outwardly from each of the pair of gathering chains 110 of the row unit assembly 30 of the row crop head 20. As used herein, the term "gathering chain" is intended to include or encompass any type of continuous loop, whether formed from chain links, an elastomeric belt, or any other structure formed as a continuous loop suitable for the intended purpose. Furthermore, although the gathering chains disclosed herein are particularly suitable for use on corn head, the features and advantages of the gathering chain may be equally suitable for other types of heads for harvesting other types of row crops. Accordingly, despite references being made specifically to corn crops and corn heads or corn head components, such references are made only as an example of a particular type of row crop and row crop head on which the gathering chains disclosed herein may be used. Therefore, the present disclosure should not be construed as being limited to corn heads or harvesting of corn, and should be understood to be applicable to any type of row crop and any type of row crop head on which gathering chains may be used.

In each of the embodiments, the lateral extensions 200 extend sufficiently laterally outwardly from each of the pair of gathering chains 110 in sufficiently close end to end relation or in overlapping relation to effectively close off the area which defines the path of travel 111 approximately along the centerline of the incoming crop into the row unit assembly 30 as the combine drives forwardly through the field harvesting the crop. By effectively closing off the area defining the path 111 of the incoming crop, the individual kernels and small crop pieces are captured by the lateral extensions 200 and conveyed into the head 20 so they cannot fall to the ground below the head resulting in reduced yield of the crop available for harvest.

For ease of reference in connection with the description of each of the various embodiments, the combination of the gathering chains or belts 110 with the lateral extensions 200 are referred to as gathering chain assemblies 112 and are differentiated among the various embodiments by suffix letters A-F and the corresponding parts of each of the chain gathering assemblies 112 are similarly designated by suffix letters A-F.

Figure 7:
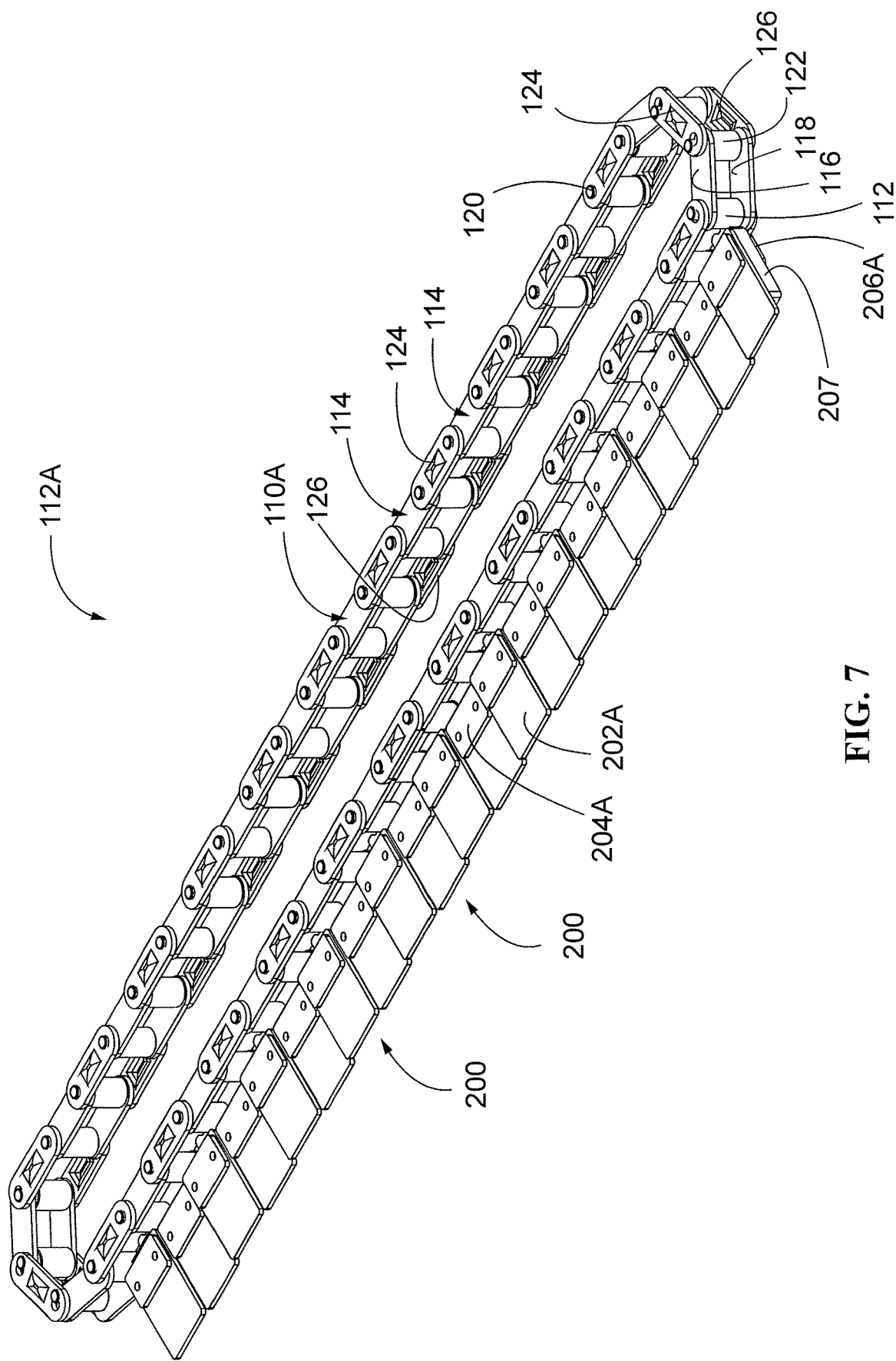
FIG. 7 is a perspective view of an embodiment of a gathering chain assembly in which the conveying surface includes paddles.
Figure 8:
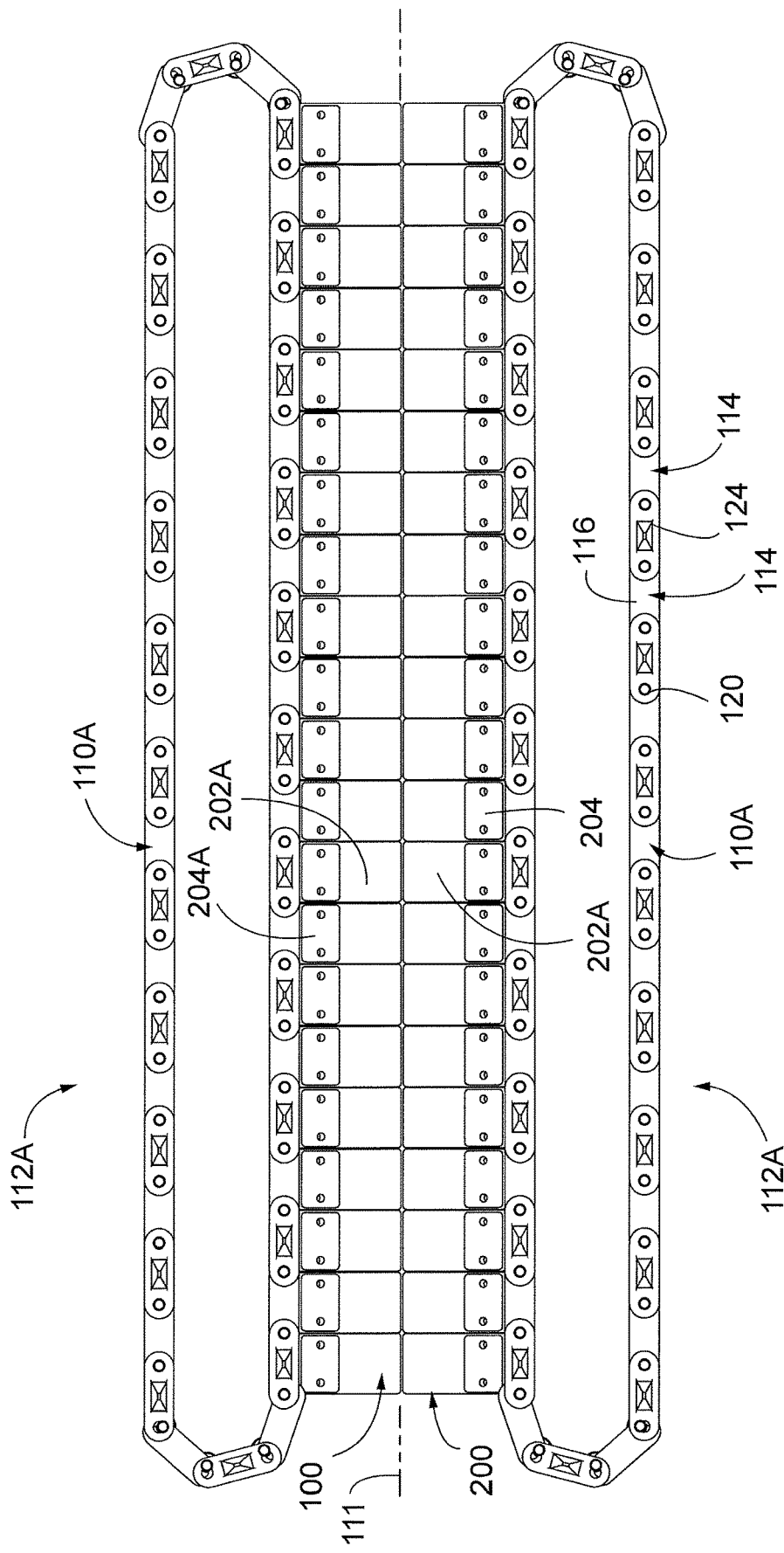
FIG. 8 is a top plan view showing a pair of adjacent gathering chain assemblies of FIG. 7 configured on a row unit.
Figure 9:
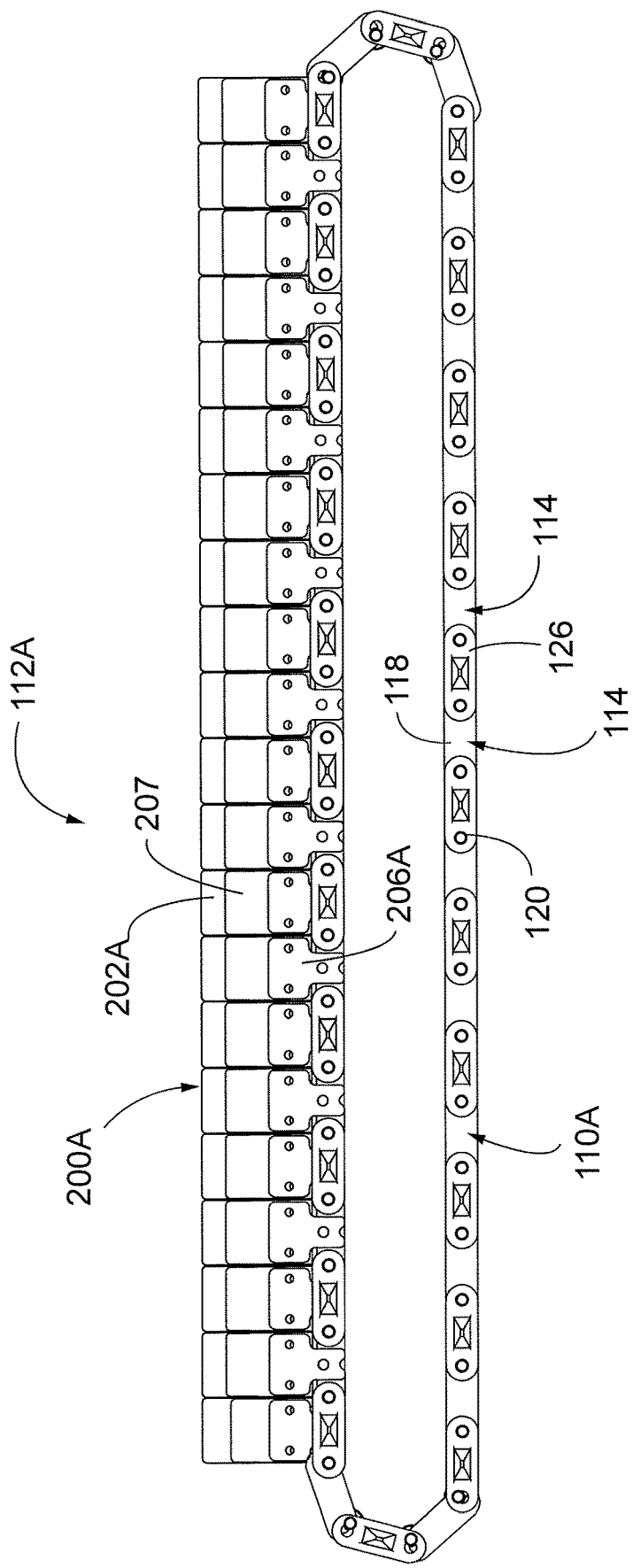
FIG. 9 is a bottom plan view of the gathering chain assembly of FIG. 7.

Accordingly, in a first embodiment as illustrated in FIGS. 7-9, and particularly FIG. 8, the conveying surface 100 of the gathering chain assembly 112A is created by the opposing lateral extensions 200 in the form of paddles 202A secured to a conventional gathering chain 110A constructed of chain links 114. Although not shown in FIG. 8, the gathering chain 110A and its chain links 114 are sized to extend around and receive the drive sprocket 38 and idler sprocket 39 of a row unit 30 of a head 20. The size of the gather chain 110A and links 114 may vary between makes and models of heads 20, and therefore the gathering chain assembly 112A is not limited to the embodiment shown and described herein.

The links 114 of the gathering chain 110A are constructed in a conventional manner with each link 114 having a pair of upper and lower plates 116, 118 joined by pins 120 extending through rollers 122. Upper and lower link connecting plates 124, 126 pivotally join the individual links 114 thereby forming a continuous chain loop.

In this embodiment, the lateral extension 200 includes a paddle 202A attached to the gathering chain 110A by upper and lower bracket plates 204A, 206A. While not shown in FIGS. 7-9, it should be understood that the lateral extensions 200 are attached along the entire length of the gathering chain 110A. In the embodiment shown, the paddle 202A is secured to the gathering chain 110A, at the outer side of each lower plate 118 and each lower link connecting plate 16 as best illustrated in FIG. 9. It should be appreciated that, paddle 202A may be attached at any other interval, e.g., every other link 114. The specific number and size of the paddles 202A, the interval at which they are attached to the gathering chain 110A and their orientation relative to one another or the gathering chain 110 may depend on the agronomic characteristics for the crop being harvested, such as the type of crop or the condition of the crop. For example, the paddles 202A may be oriented so that a first paddle is attached to extend substantially lateral from the roller chain while a second paddle is attached to extend substantially perpendicular to the adjacent first paddle. This is only one example of many possible combinations of the number of paddles, intervals and orientations of the present disclosure, is not intended to limit the present disclosure and is provided to demonstrate at least some of the principles of the present disclosure.

As shown in FIG. 7, adjacent paddles 202A may be vertically staggered or offset, but the paddles 202A may be configured so they are vertically aligned along a single plane. The lower bracket plate 206A may be a flat plate that is fastened, such as by pins, rivets or other connectors to the underside of the lower link plate 118. The upper bracket plate 204A may be fastened by pins, rivets or other connectors to the lower bracket plate 206A with the paddle 202A sandwiched therebetween. The bracket plates 204A, 206A may provide additional support to reduce the amount of deflection experienced by the paddle 202A. The bracket plates 204A, 206 may also be configured to adjust the location at which the paddle 202A will flex or bend. For example, if the paddle 202A is required to be more pliable, the bracket plates 204A, 206A may be shortened, such that the plates 204A, 206A do not extend as far out from the gathering chain 110A. Alternatively, if it is desired to have more rigid or less pliable paddles 202A, the bracket plates 204A, 206A may be longer so they extend further outwardly so they terminate closer to the outer end of the paddle 202A. Additionally, a stiffener plate 207 (FIGS. 7, 9) may be disposed on the underside of the paddle 202A and retained between the upper and lower bracket plats 204A, 206A.

The paddle 202A may be constructed from any number of materials that provide the necessary functional requirements or to correspond to the agronomic characteristics of the crop being harvested, such as the type of crop or the crop condition. The paddle 202A may be constructed from a pliable material, such as Thermo-Plastic Urethane (TPU) or a Thermo-Plastic Elastomer (TPE). The paddle 202A may also be constructed from a more rigid material such as a hard plastic or metal alloy. Generally the paddle 202A will be configured such that a plant stalk, such as a corn stalk, may pass between the paddles 202A of opposing sides of the row unit 30. For example, in an embodiment where the paddles 202A of opposing sides of the row unit 30 are configured to overlap, the paddles 202A may be constructed of a suitably pliable material to provide the necessary deflection of the opposing paddles 202A to allow the cornstalk 12 to pass between them. Alternatively, if the paddles 202A of the opposing sides of the row unit 30 are configured such that their outer ends abut one another, then a more rigid material, such as a metal alloy, may be used to construct the paddles 202A.

Figure 10:
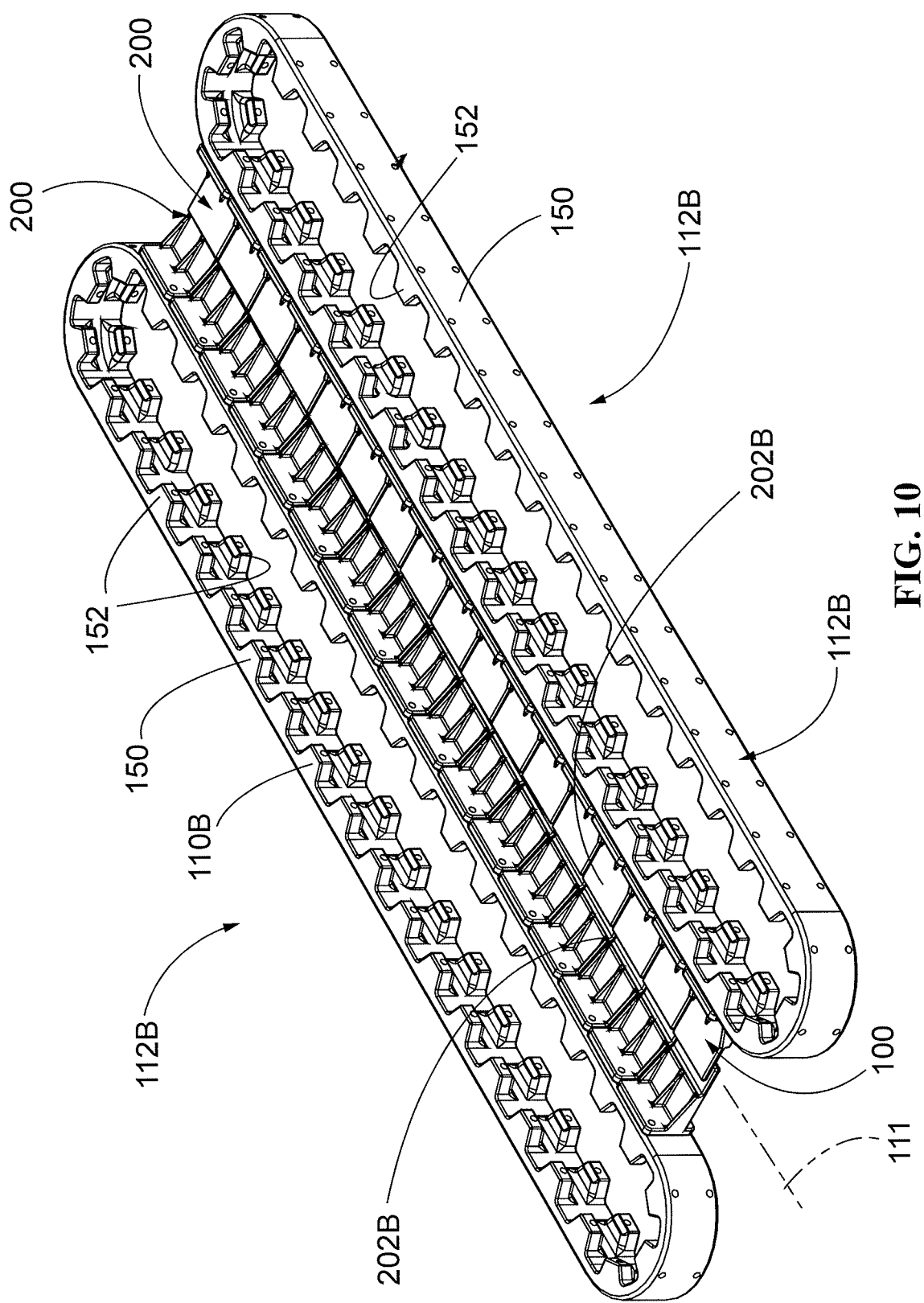
FIG. 10 is a perspective view of another embodiment of a pair of gathering chain assemblies configured on a row unit in which the conveying surface includes paddles.
Figure 11:
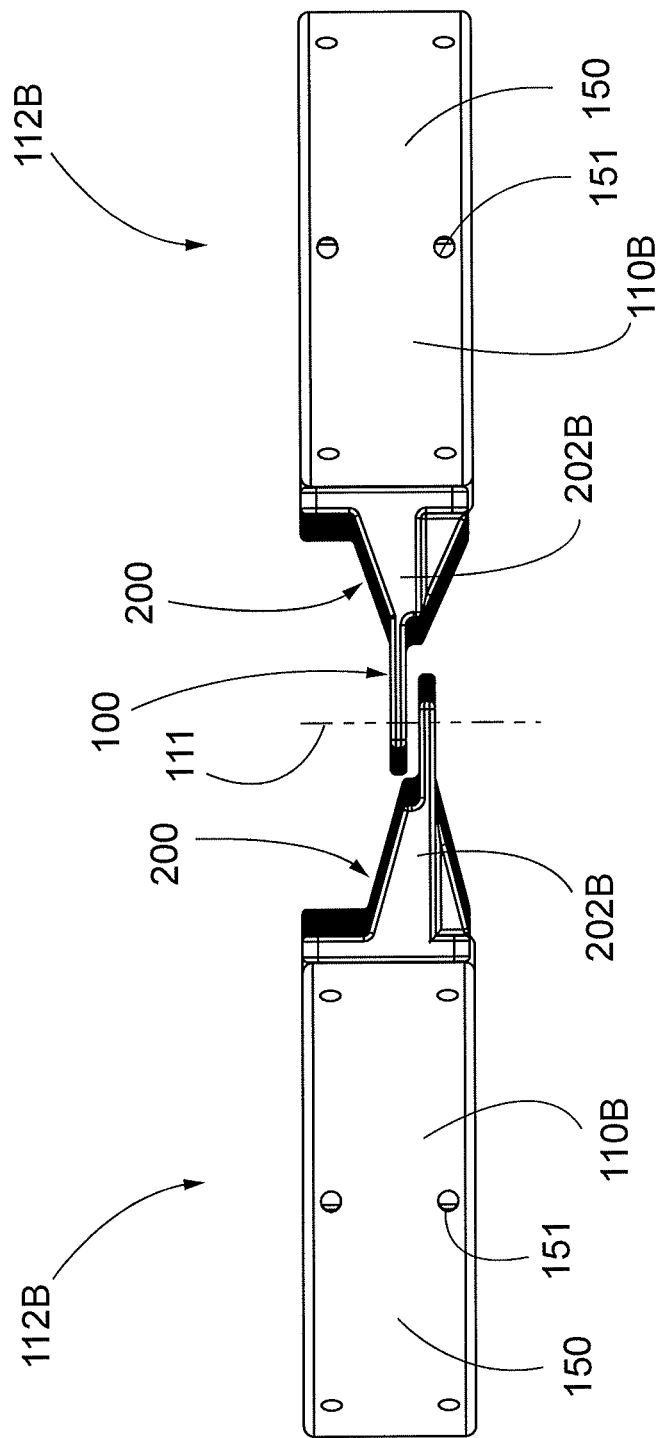
FIG. 11 is an end view of the pair of gathering chain assemblies of FIG. 10.

FIGS. 10-11 illustrate an alternative embodiment of a gathering chain assembly 112B providing the conveying surface 100 created by the opposing lateral extensions 200 also in the form of paddles 202B secured to a gathering chain 110B comprising a flexible belt 150 having molded teeth 152 on an inner periphery of the belt 150. The belt 150 may be constructed of a rubber material including but not limited to polyurethane or a thermoplastic elastomer, such as thermoplastic polyurethane. In this embodiment, the paddles 202B are shown as a molded block which can be secured directly to the flexible belt 150 by fasteners, such as pins, rivets or other connectors extending through apertures 151 in the flexible belt 150. and a paddle plate 204B for securing the paddles 202B to the outer surface of the belt 150. The molded teeth 152 on the inner periphery of the belt 150 are configured to matingly align and cooperate with the tooth pattern of the drive sprocket 38 and idler sprocket 39. It is recognized that a belt can generally be used in lieu of a chain. Some of the advantages of a belt are that a belt will typically cost less and generates less noise than a chain and does not require lubrication. The various components of the row unit 30 are not shown in FIGS. 10-11 in order to better display the features of the gathering chain assembly 112B. It should be appreciated that the configuration of the sprockets and belt 150 may vary between makes and models of combine grain heads as recognized and understood by those of skill in the art.

Additionally, while not shown in FIGS. 10-11, it should be understood that the paddles go all the way around the outer surface of the belt 150, such that the paddles 200B are adjacent one another and continuous along the entire length of the belt 150. The specific number of paddles 200B, the size of the paddles 200B, the interval at which they are positioned and their orientation relative to one another or the belt 150 may depend on the agronomic characteristics for the crop being harvested, such as the type of crop or the condition of the crop. The paddles 202B may oriented so that a first paddle is placed to extend substantially lateral from the belt 150 while a second paddle is positioned substantially perpendicular to the adjacent first paddle. This is only one example of many possible combinations of the number of paddles, intervals and orientations of the present disclosure, is not intended to limit the present disclosure and is provided to demonstrate at least some of the principles of the present disclosure.

FIG. 11 is an end elevation view of the pair of adjacent gathering chain assemblies 112B showing in FIG. 10. In this embodiment, the paddles 202B are shown extending outwardly with their ends overlapping, but it should be appreciated that the paddles may be configured such that their ends are aligned along a plane.

Figure 12:
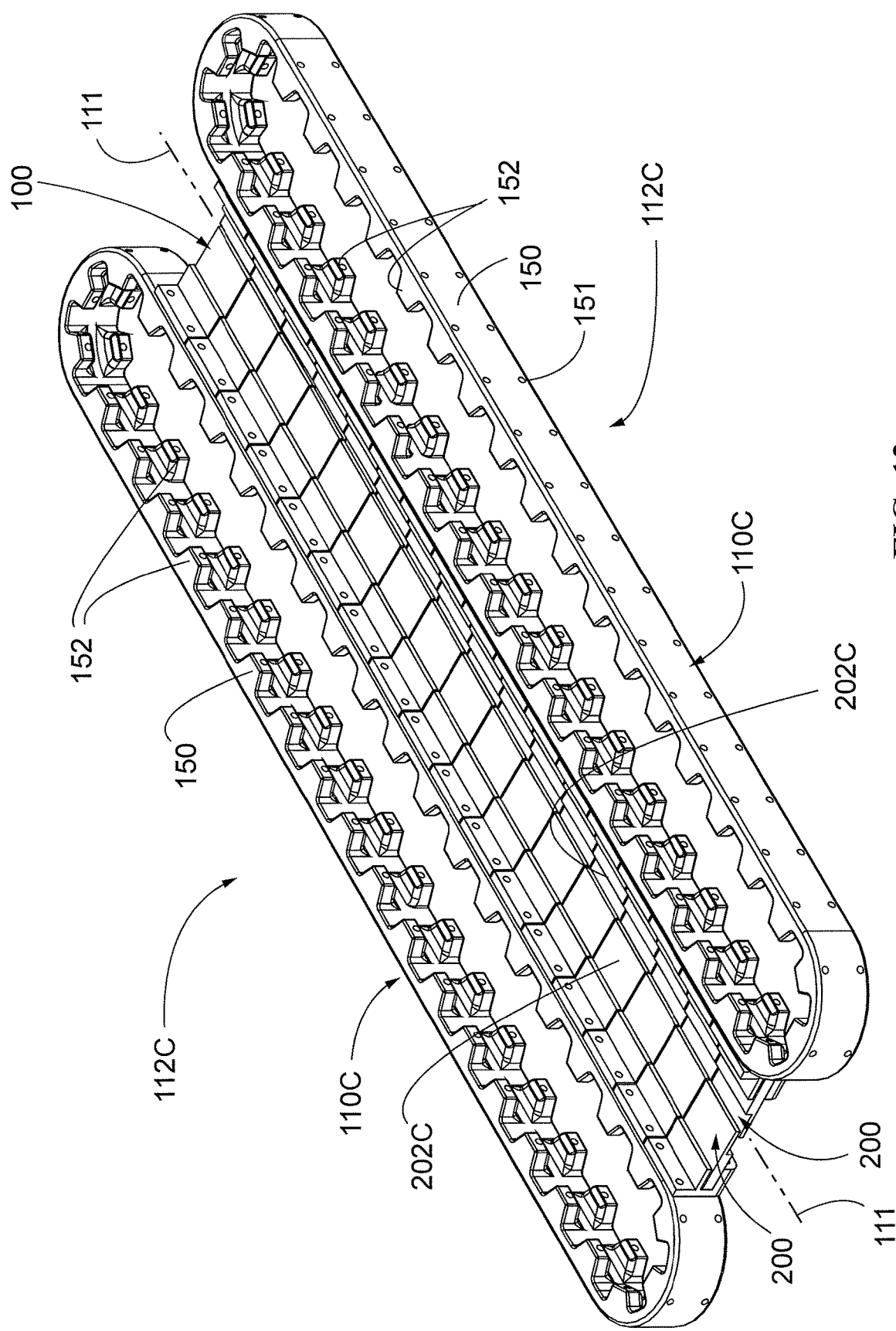
FIG. 12 is a perspective view of another embodiment of a pair of gathering chain assemblies configured on a row unit in which the conveying surface includes paddles.
Figure 13:
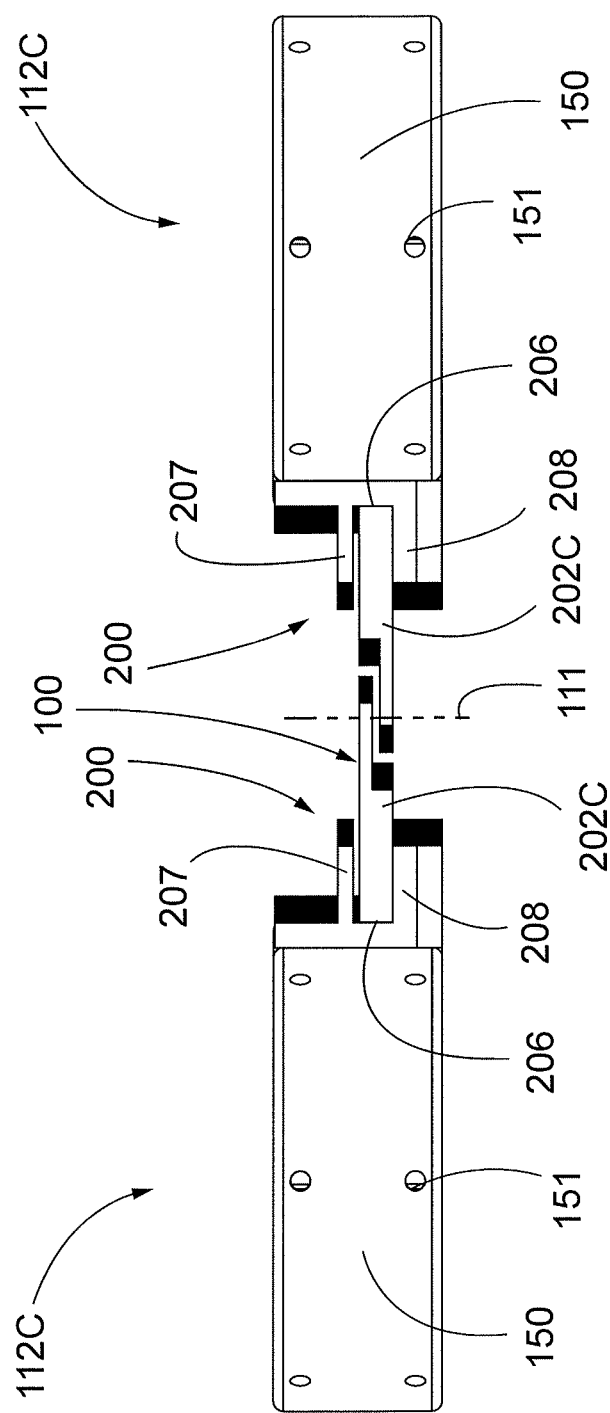
FIG. 13 is an end view of the pair of gathering chain assemblies of FIG. 12.

FIGS. 12-13 illustrate another alternative embodiment of a gathering chain assembly 112C providing the conveying surface 100 created by the opposing lateral extensions 200 also in the form of paddles 202C secured to a gathering chain 110C comprising a flexible belt 150 having molded teeth 152 on an inner periphery of the belt 150. The gathering chains 112C are shown arranged for mounting on a row unit 30, with the various components of the row unit 30 removed for clarity. Additionally, while not shown in FIG. 12, it should be appreciated that the paddles 202C go all the way around the outer surface of the belt 150, such that the paddles 202C are adjacent one another and continuous along the entire length of the belt 150.

The configuration of the paddles 202C are best illustrated in FIG. 13, which is an end elevation view of the adjacent gathering chain assemblies 112C shown in FIG. 13. As in the previous embodiment, the paddles 202C are configured with their outer ends overlapping, but it should be appreciated that the paddles may be configured such that their ends are aligned along a plane. In this embodiment, the paddles 202C includes a paddle bracket 204C comprises a channel or U-shaped recess 206 into which the paddle 202C is received between upper and lower flanges 207, 208. The paddle bracket 204C is configured to support the paddle 202C and limit the degree to which the paddle 202C may be bent or deflected. The U-shaped configuration can limit the deflection of the paddle in multiple directions. For example, the upper flange 207 located above the paddle 202C will prevent the paddle 202C from being deflected upward and the flange 208 located below the paddle 202C with prevent the paddle 202C from being deflected in a downward direction.

Figure 14:
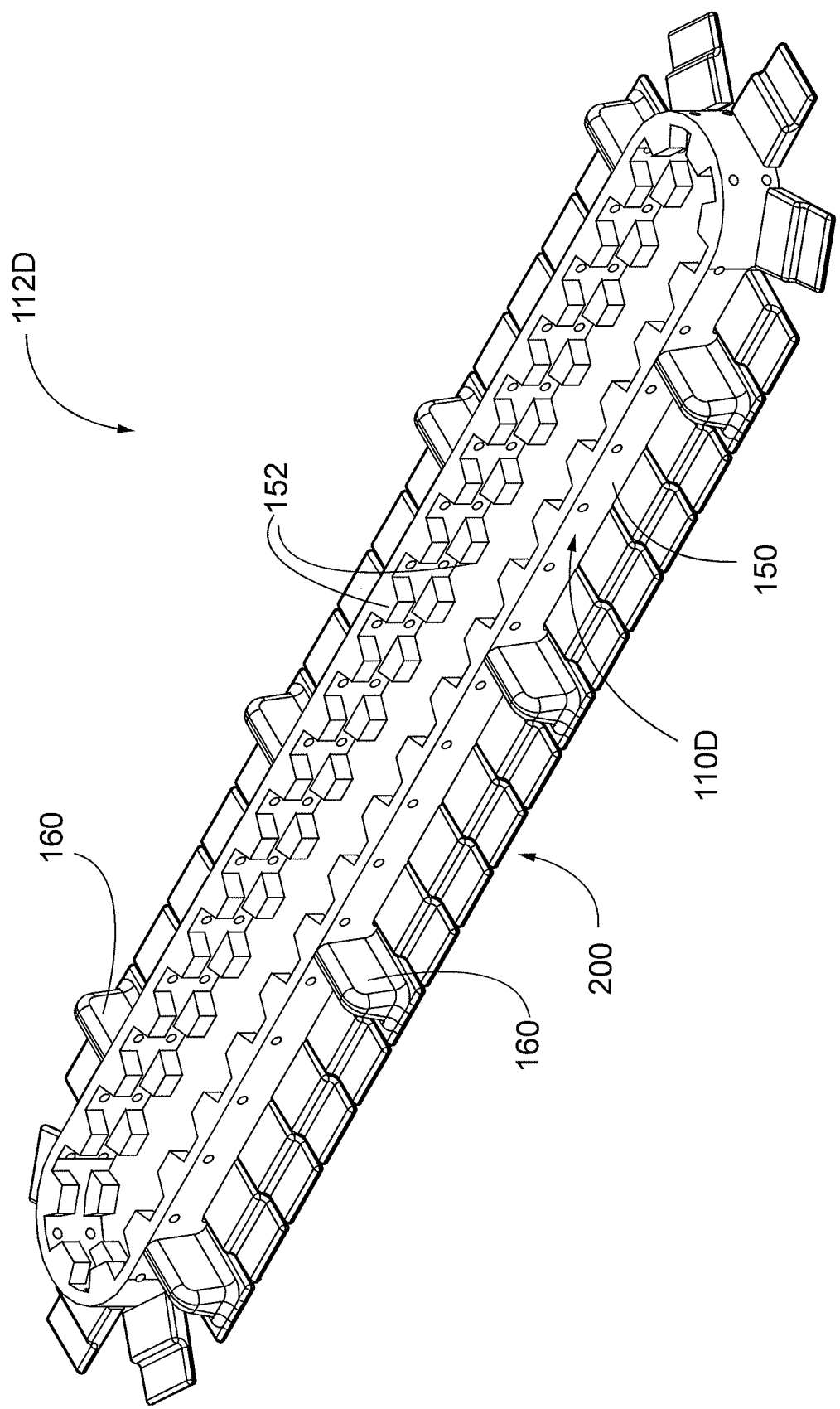
FIG. 14 is a perspective view of another embodiment of a gathering chain assembly in which the conveying surface includes paddles.
Figure 15:
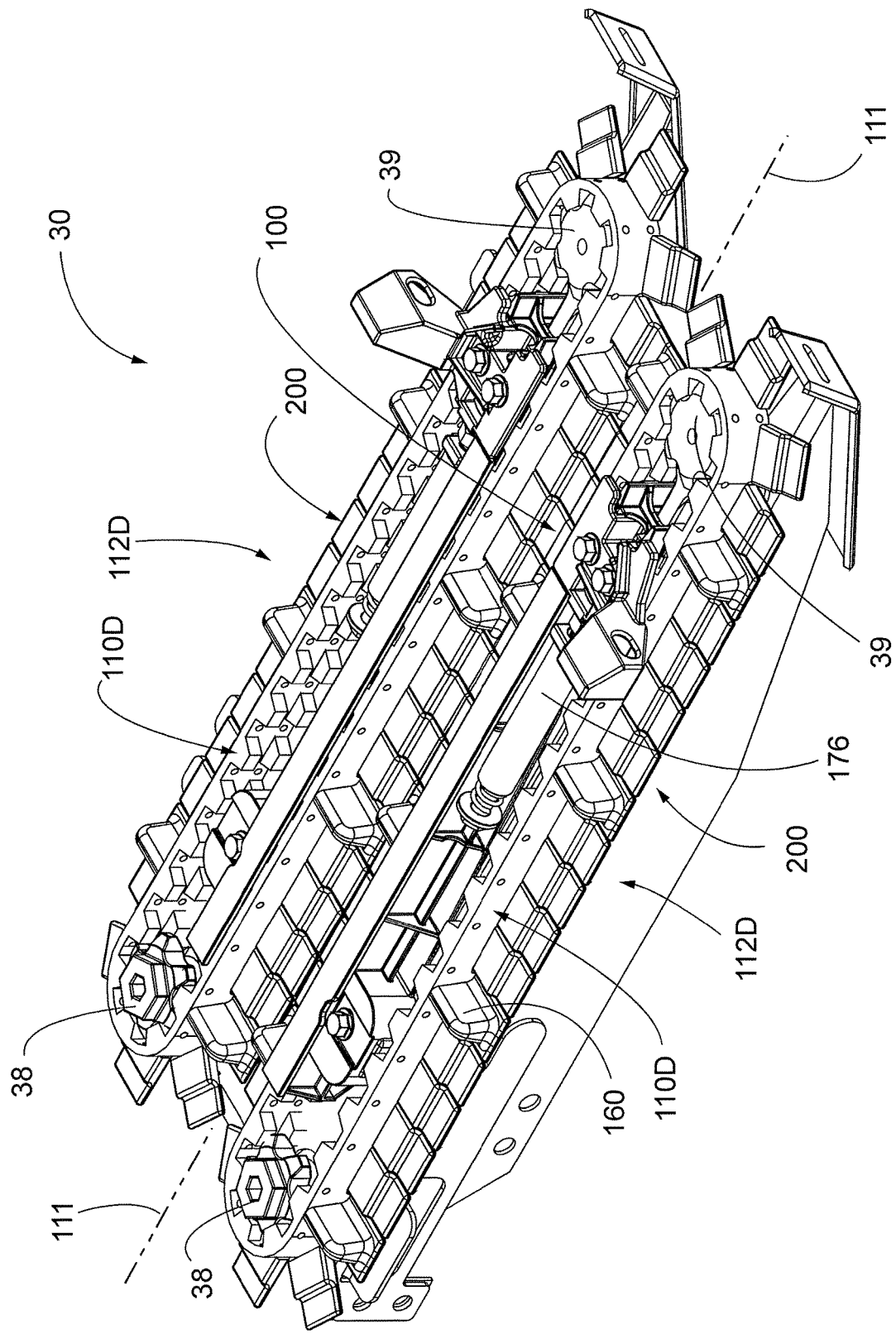
FIG. 15 is a front perspective view of a row unit with the gathering chain assemblies of FIG. 14.
Figure 16:
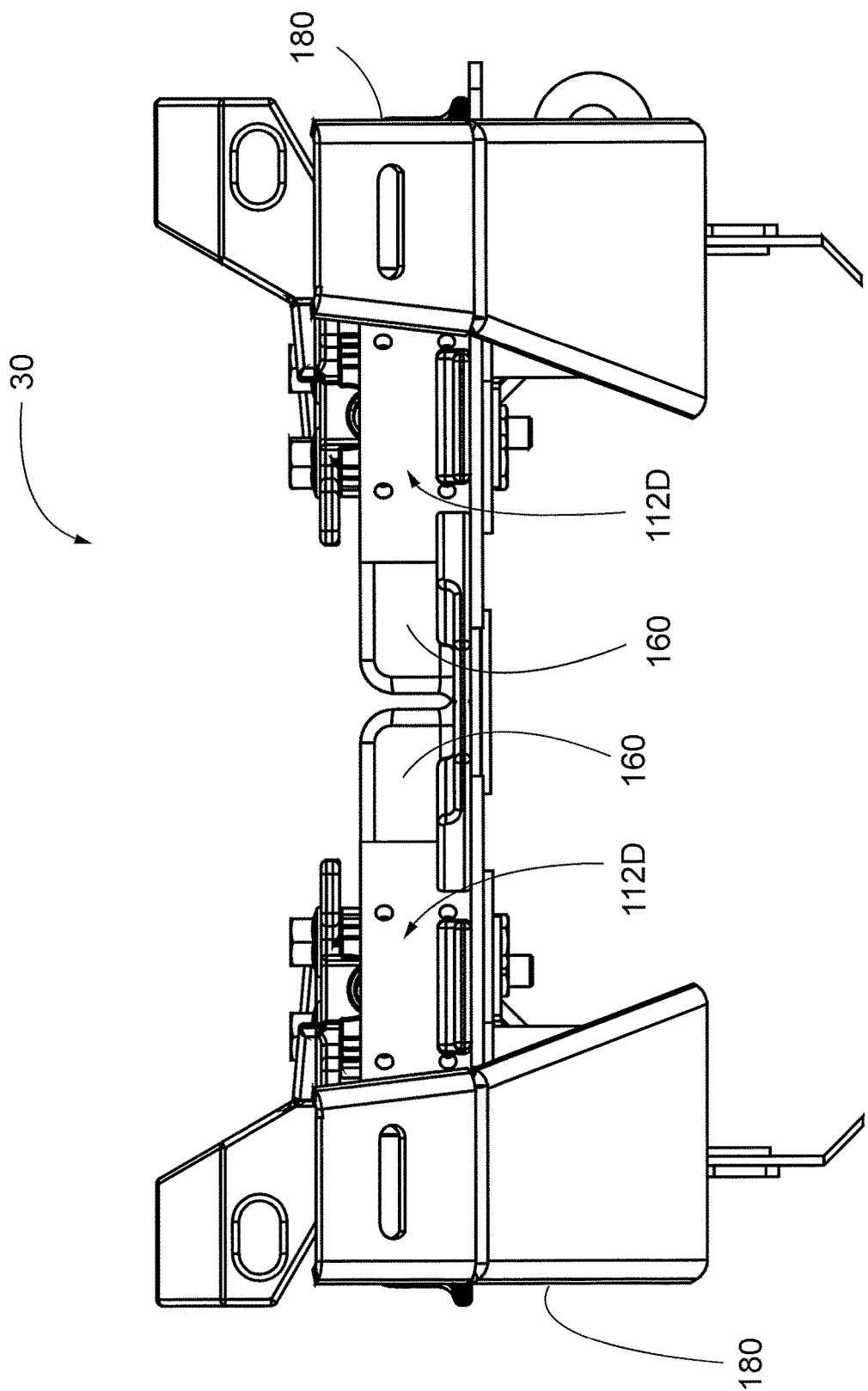
FIG. 16 is an elevation view of the row unit of FIG. 15.
Figure 17:
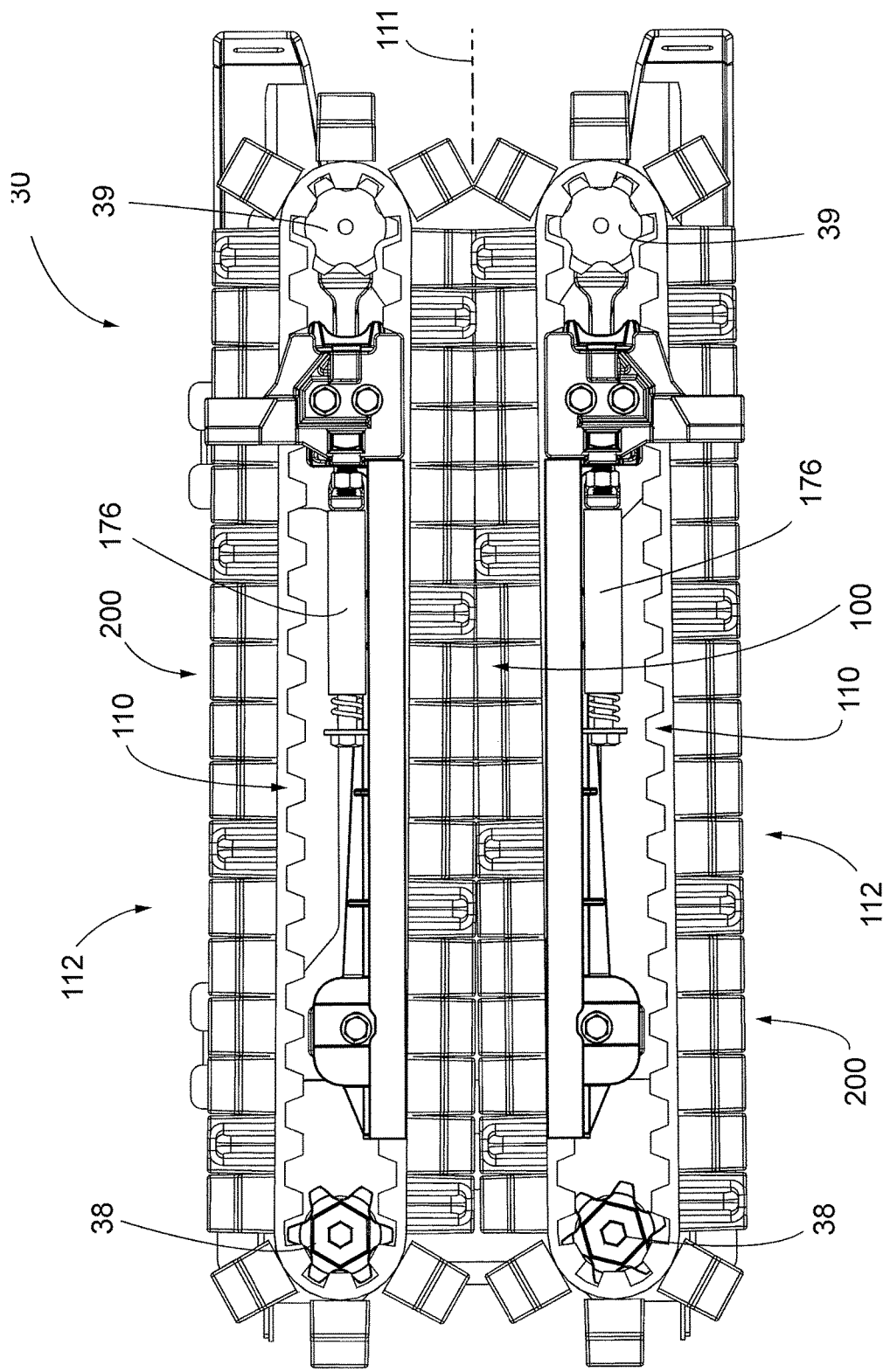
FIG. 17 is a top plan view of the row unit of FIG. 15.

FIGS. 13-14 illustrate another alternative embodiment of a gathering chain assembly 112D providing the conveying surface 100 created by the opposing lateral extensions 200 also in the form of paddles 202D secured to a gathering chain 110D comprising a flexible belt 150 having molded teeth 152 on an inner periphery of the belt 150.

FIG. 14 is a perspective view of a single gathering chain assembly 112D. In this embodiment, the gathering chain assembly 112D includes vertical tabs 160 spaced equidistantly around the belt 150, and projecting vertically above the paddles 202D. The vertical tabs 160 are configured to convey collected particulate material toward the rear of the row unit 30. For example, for a row unit 30 that may be used to harvest corn, once the ear of corn is removed from the stalk, the corn will land on the paddles 202D, and the vertical tabs 160 will collect and move the separated ear in a generally rearward direction as the gathering chain assembly 112D rotates. It is contemplated that the tabs 160 may be integral with the belt 150 or the tabs 160 may extend from the paddle 202D or comprise an altogether separate part or component spaced between the paddles 202D. The tab 160 may be placed at any interval along the belt 150 and need not be equidistantly spaced. The specific number of tabs 160, the size of the tabs 160, the interval at which they are placed and their orientation relative to one another or the belt 150 may depend on the agronomic characteristics for the crop being harvested, such as the type of crop or the condition of the crop and therefore the embodiment shown is not intended to limit the present disclosure and is provided to demonstrate at least some of the principles of the present disclosure. For example, if the gathering chain assembly 112D is used to harvest corn, the vertical tabs 160 may be spaced approximately eight to fifteen inches apart along the belt 150. However, if used to harvest a smaller row crop, such as soybeans, the vertical tabs 160 may need to be oriented closer together, for example, spaced approximately four to six inches apart along the belt 150.

The vertical tabs 160 may be constructed from any number of materials that provide the necessary functional requirements. The vertical tabs 160 may be constructed from a pliable material, such as Thermo-Plastic Urethane (TPU) or a Thermo-Plastic Elastomer (TPE). The vertical tabs 160 may also be constructed from a more rigid material such as a hard plastic or metal alloy.

FIGS. 15-18 are representative of row unit 30 on which the gathering chain assembly 112 may be utilized. Although the embodiment shown illustrates the gathering chain assembly 112D, any of the gathering chain assemblies 112A, 112B and 112C as well as the gathering chain assemblies 112E and 112F (discussed below) may be utilized on the row unit 30. The gathering chain assemblies 112 are disposed over the drive sprocket 38 and idler sprocket 39 such that the gathering chain assemblies 112 are oriented in a parallel side-by-side relationship. The drive sprocket 38 and idler sprocket 39 have a tooth pattern matched to that of the molded teeth 152 on the interior surface of the belt 150 (or the links 114 of the gathering chain 110 of embodiments 112A, 112F or 112G). In the embodiments where the gathering chain 110 utilizes a belt 150, a conventional spring tensioner assembly 176 may be provided to maintain the desired tension to prevent the belt 150 from slipping off the drive sprocket 38 or the idler sprocket 39. If it is desired to remove the gathering chain 110, in the event it becomes worn out or breaks, the tension on the gathering chain 110 may be reduced to will allow the gathering chain 110 to be dislodged from the drive sprocket 38 and/or the idler sprocket 39.

The drive sprocket 38 may be rotated by an operatively attached shaft or gearbox. It should be appreciated that the drive sprockets 38 of the opposing gathering chain assemblies 112 rotate in opposite directions such that the opposing gathering chain assemblies 112 will work in unison to convey particulate material along the center of the row unit 30 in a generally rearward direction. For example, referring to FIG. 15, the drive sprocket 38 of the left hand gathering chain assembly 112 rotates in a counter-clockwise direction (when viewed from above) and the drive sprocket 38 of the right hand gathering chain assembly 112 rotates in a clockwise direction (when viewed from above). The rotation of the drive sprockets 38 cause the opposing gathering chain assemblies 112 engaged therewith to rotate rearwardly along line 111 with respect to the forward direction of travel of the head 20. This rearward movement will convey the grain or other collected particulate material to the auger 24 disposed at the rear of the grain head 20. The auger 24 of the grain head 20 are configured to convey the particulate material from the opposing left and right ends of the head 20, toward the opening 27 of the feederhouse 26 at the center of the grain head 20, where it is then fed into the feederhouse 26 for further processing within the interior of the combine.

Figure 18:
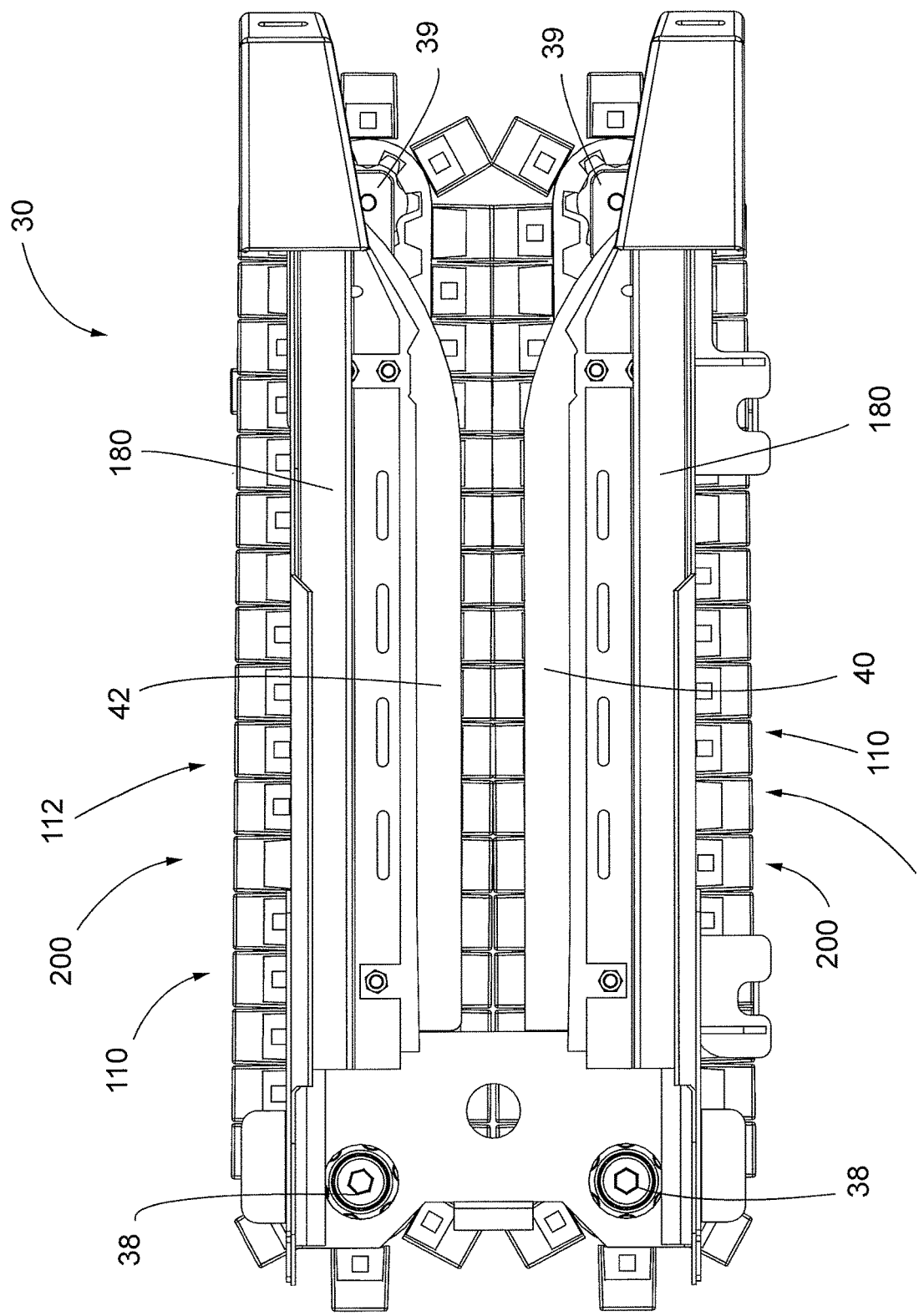
FIG. 18 is a bottom plan view of the row unit of FIG. 15.

As shown, the row unit 30 includes frame members 180 from which the stripper plates 40, 42 are supported (see bottom plan view of FIG. 18). Although the row unit 30 will include stalk rollers, the stalk rollers are excluded from FIGS. 15-18 to provide a more detailed representation of gathering chain assembly 112. The stalk rollers would be attached on the underside of the row unit 30 to a gear box (not shown) and will rotate to pull the stalk 12 downwardly between the stripper plates 40, 42 to strip the ears from the cornstalks as previously described in the Background.

Figure 5:
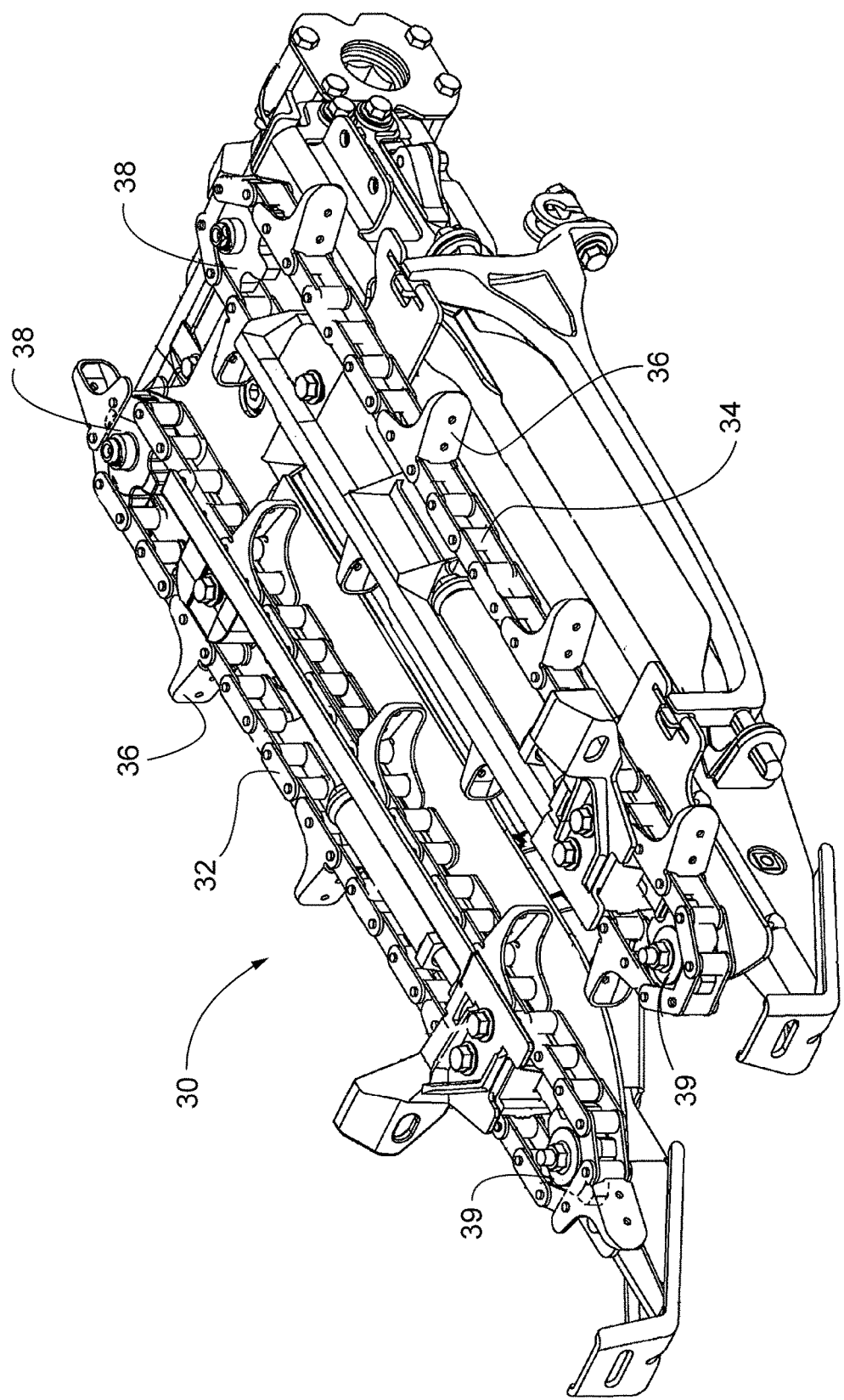
FIG. 5 is a perspective view of a row unit assembly.
Figure 6:
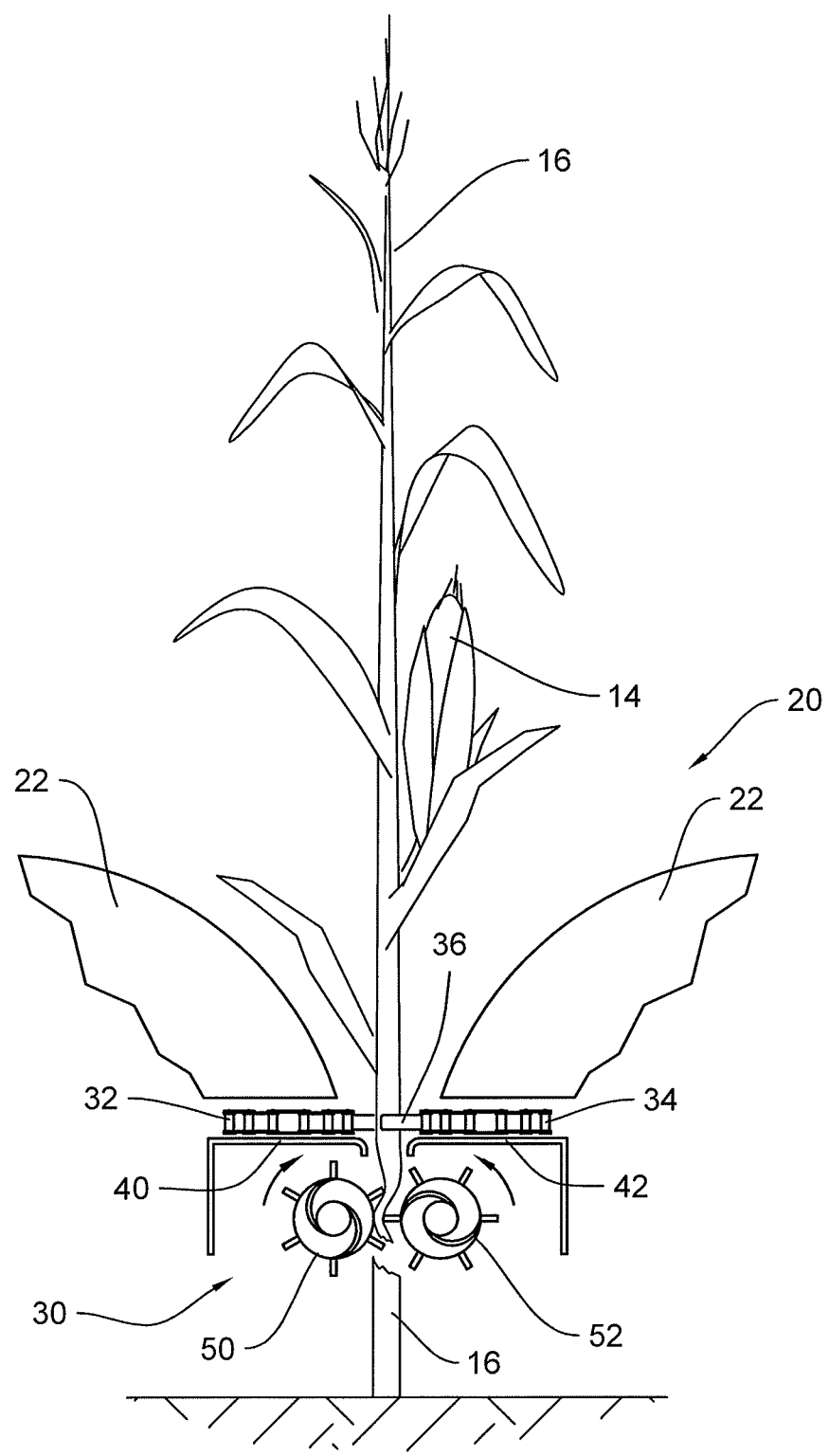
FIG. 6 is a partial front elevation view of the row unit assembly of FIG. 5 depicting the relationship of the row unit relative to a cornstalk during harvesting operations.

It is also contemplated that a row unit 30 on the head 20 may be converted from the conventional gathering chain 32 with lugs 36 (FIG. 5) to any one of the gathering chain assemblies 112A-112F. It should be appreciated, that it may be desirable to change the drive sprocket 38 and/or idler sprocket 39 to match the links and/or tooth pattern of the gathering chain assembly embodiments 112A-112F disclosed herein.

Referring now to FIGS. 19-24, another alternative embodiment of a conveying surface 100 is shown (only half of the conveying surface 100 is shown) wherein the conveying surface 100 comprises lateral extensions 200 in the form of a plurality of bristle blocks or brush blocks 210 wherein bristles 212 form the conveying surface 100 as opposed to paddles 202 as described in connection with the previous embodiments of the gathering chain assemblies 112A-112D.

Figure 19:
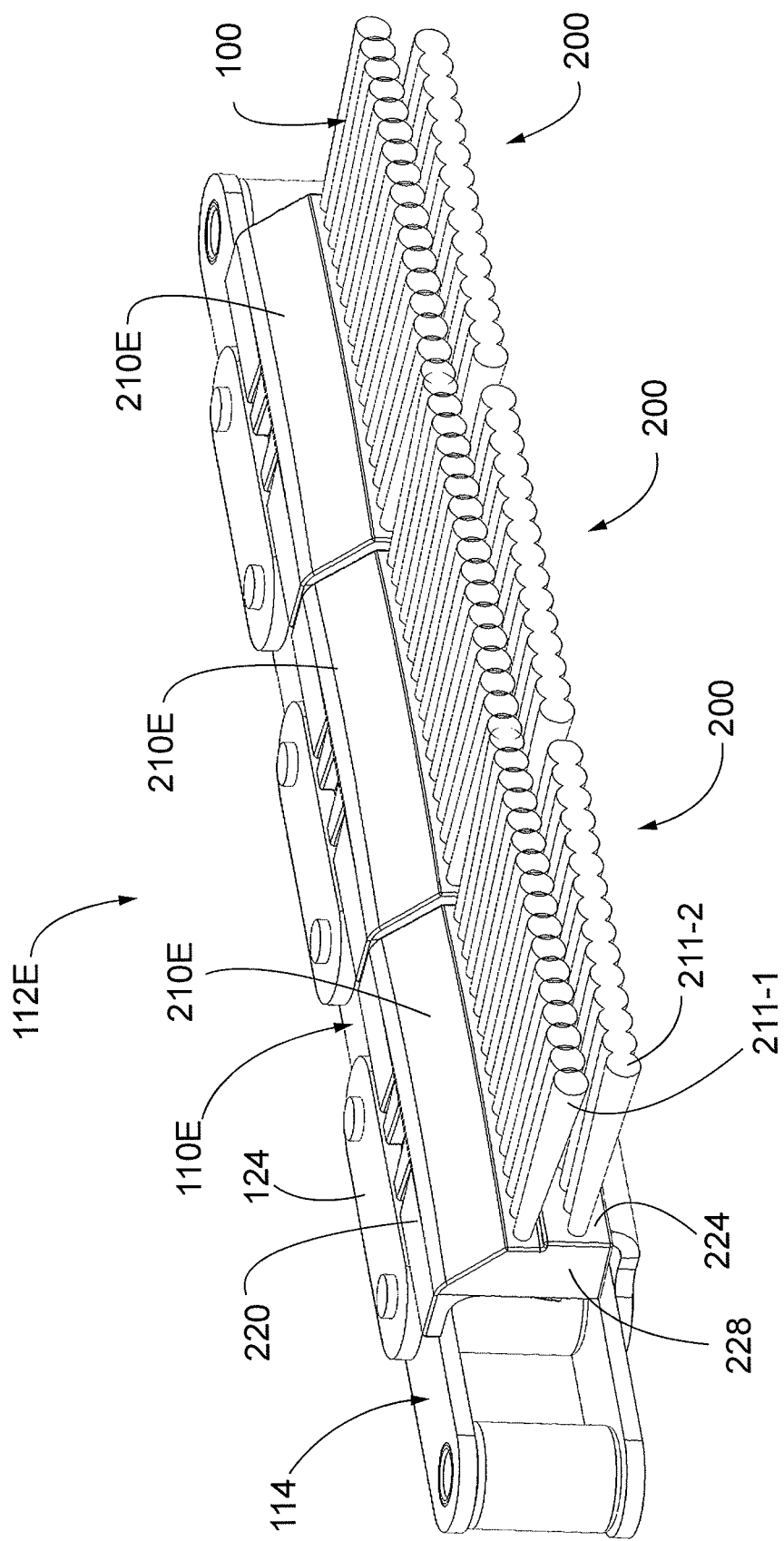
FIG. 19 is a perspective view of another embodiment of a segment of a gathering chain assembly in which the conveying surface includes bristles.
Figure 20:
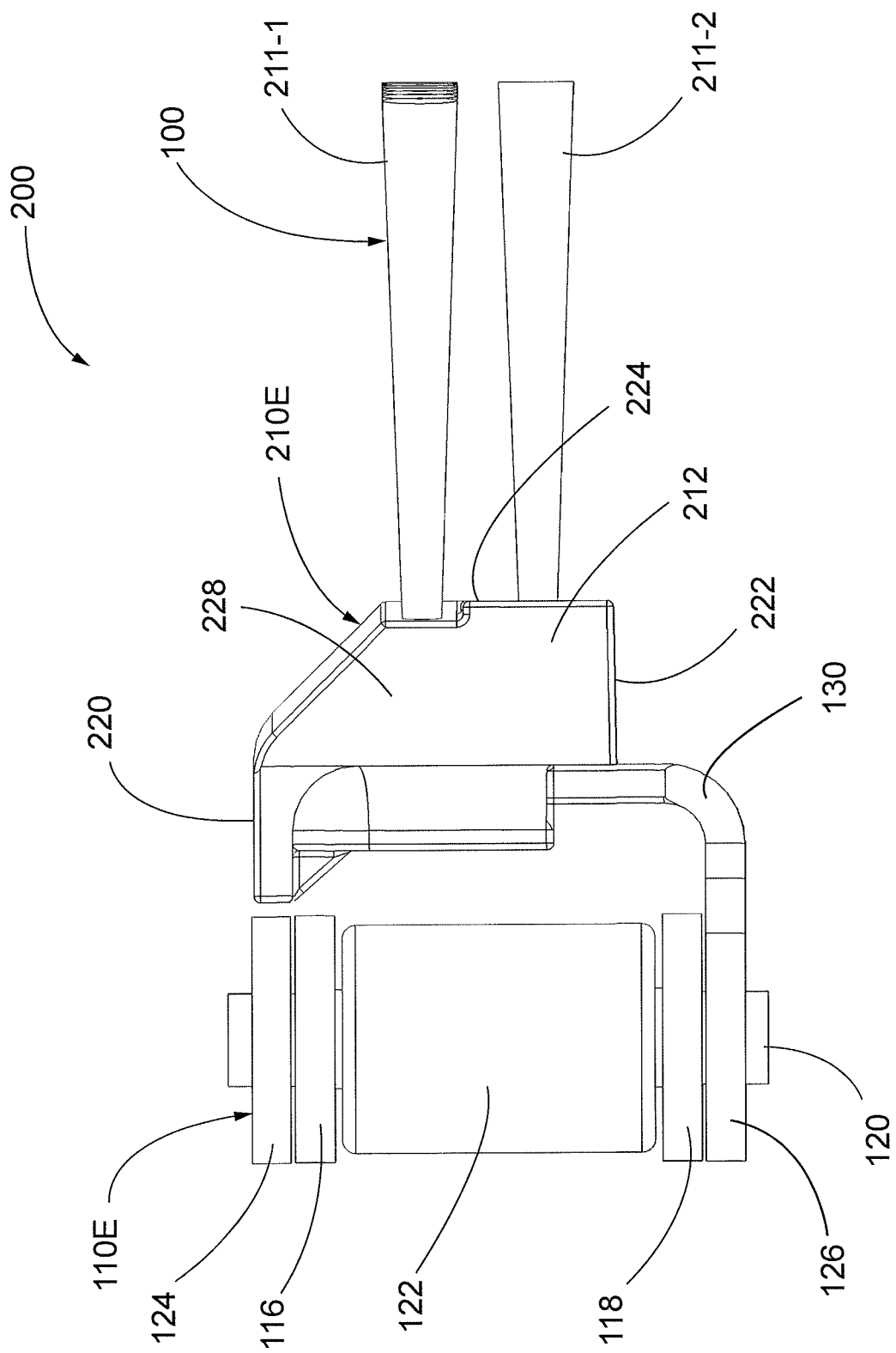
FIG. 20 is an end elevation view of the gathering chain assembly of FIG. 19.
Figure 21:
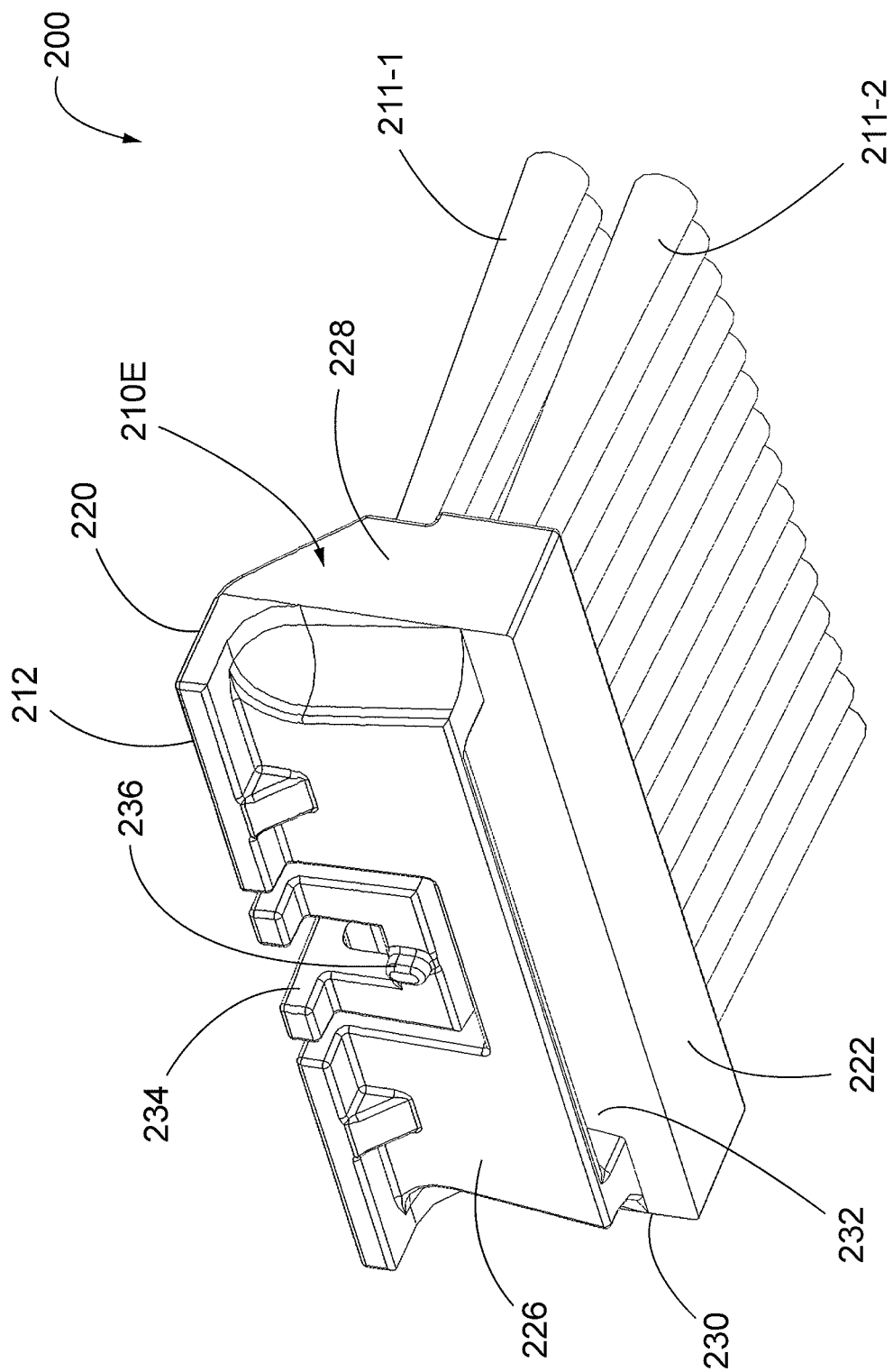
FIG. 21 is a rear perspective view of a bristle block of the gathering chain assembly of FIG. 19.

In the embodiment of FIGS. 19-21, the gathering chain assembly 112E comprises a gathering chain 110E to which is secured the plurality of bristle blocks 210E. In this embodiment, the gathering chain 110E is constructed as a conventional gathering chain comprised of individual links 114 joined together by link connecting plates 124, 126 as previously described in connection with the previous embodiment of the gathering chain 110A. The bristle block 210E comprise a base 212E from which the bristles 211 extend. Although FIG. 19 shows only a segment of the gathering chain assembly 112E, it should be appreciated that the gathering chain assembly 112E is as a continuous gathering chain 110E configured to be disposed around the drive sprocket 38 and idler sprocket 39 of the row unit 30, with the bristle blocks 210E disposed around the outer periphery of the gathering chain 110E as in all the other embodiments of the gathering chain assemblies 112A-112D previously described.

As best illustrated in FIG. 20, which is an elevation view of the gathering chain assembly 112E, a mounting tab 130 is attached to the outer side of the bottom link connecting plate 126. It should be appreciated, however, that mounting tab 130 could also extend from the outer side of the top link connecting plate 124. The bristle block 210E is removably attached to the mounting tab 130. The base 212E of the bristle block 210E has a top side 220, a bottom side 222, a front side 224, a back side 226, a left side 228 and a right side 230. The plurality of bristles 211 extend from the front side 224 of the base 212E. The bristles 211 are sufficiently long such that they extend from the front side 224 of the base 212E from each of the adjacently disposed gathering chain assemblies 112E of the row unit 30 such that the ends of the bristles 211 are sufficiently close to form the conveying surface 100 to effectively close off or cover the area which defines the path 111 approximately along the centerline of the incoming crop into the row unit assembly 30 as the combine drives forwardly through the field harvesting the crop.

The back side 226 of the base 212E may include a cavity 232 into which the mounting tab 130 is matingly received. As mounting tab 130 is inserted into the cavity 232, it depresses a resilient detent 234. When the mounting tab 130 reaches the end of its travel inside the cavity 232, resilient detent 234 returns to its original position. A protrusion 236 is positioned within an aperture (not shown) of mounting tab 130. In this manner, the base 212 is retained on the gathering chain 110E during operation, but can also be removed by a user after a certain amount of wear or if a different lateral extension 200 is desired. Rather than the embodiment illustrated and described above, it should be appreciate that the base 212 may be secured to the gathering chain 110E in any other suitably rigid manner, including, for example using fasteners such as rivets or threaded fasteners, such as a screw or bolt, extending through the base 212 through the mounting tab 130.

In certain cases, the bristles 211 may provide an advantage over the paddles 202 described in connection with the previous embodiments 112A-112D by allowing debris to pass through the bristles 211 onto the ground while still capturing kernels that may result from butt shelling and impact during harvesting operations. As shown in FIG. 21, a top row of bristles 211-1 is disposed above a bottom row of bristles 211-2 with respect to the horizontal axis of the base 212. The bristles 211 may be disposed in a generally cylindrical groups at various intervals and spacing. It should be appreciated, however, that the shape of each bristle group and the number of bristles in each group may vary depending on the needs of the crop being harvested.

Figure 22:
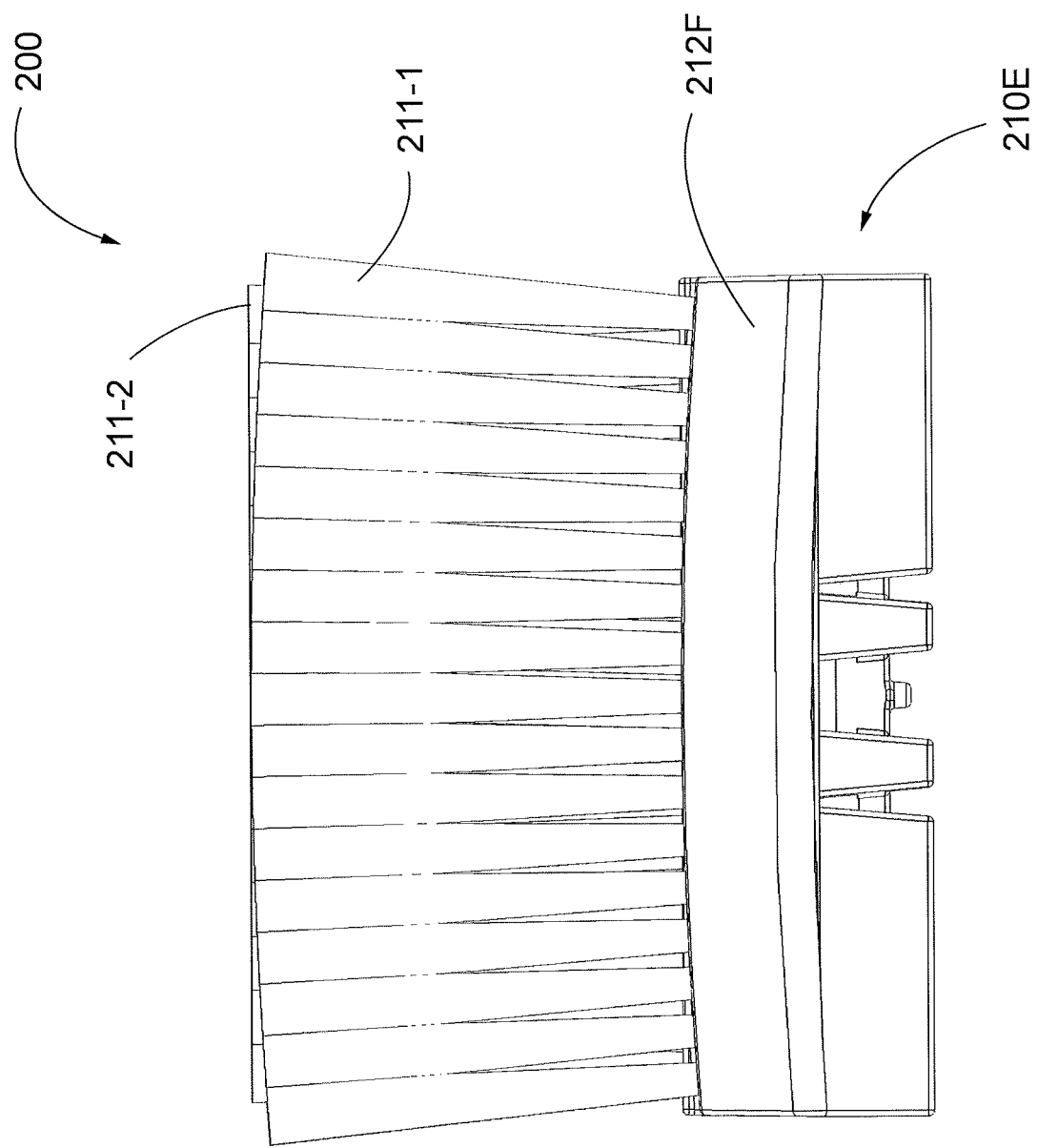
FIG. 22 is a top plan view of another embodiment of a bristle block for a gathering chain assembly.

In another embodiment of a bristle block 210F as shown in FIG. 22, the top row of bristles 211-1 are configured in an arc shape such that the bristle groups at the interior of the bristle block 210F extend further outward than the bristle groups toward the end of bristle block 210F. Further, in this embodiment, the bristle groups of the top row 111-1 and bottom row are generally the same length with respect to the amount in which they extend into the corn stalk slot. In this manner, unwanted dirt and debris may more easily pass through the bristles and the stripper slot 44 to the ground.

Figure 23:
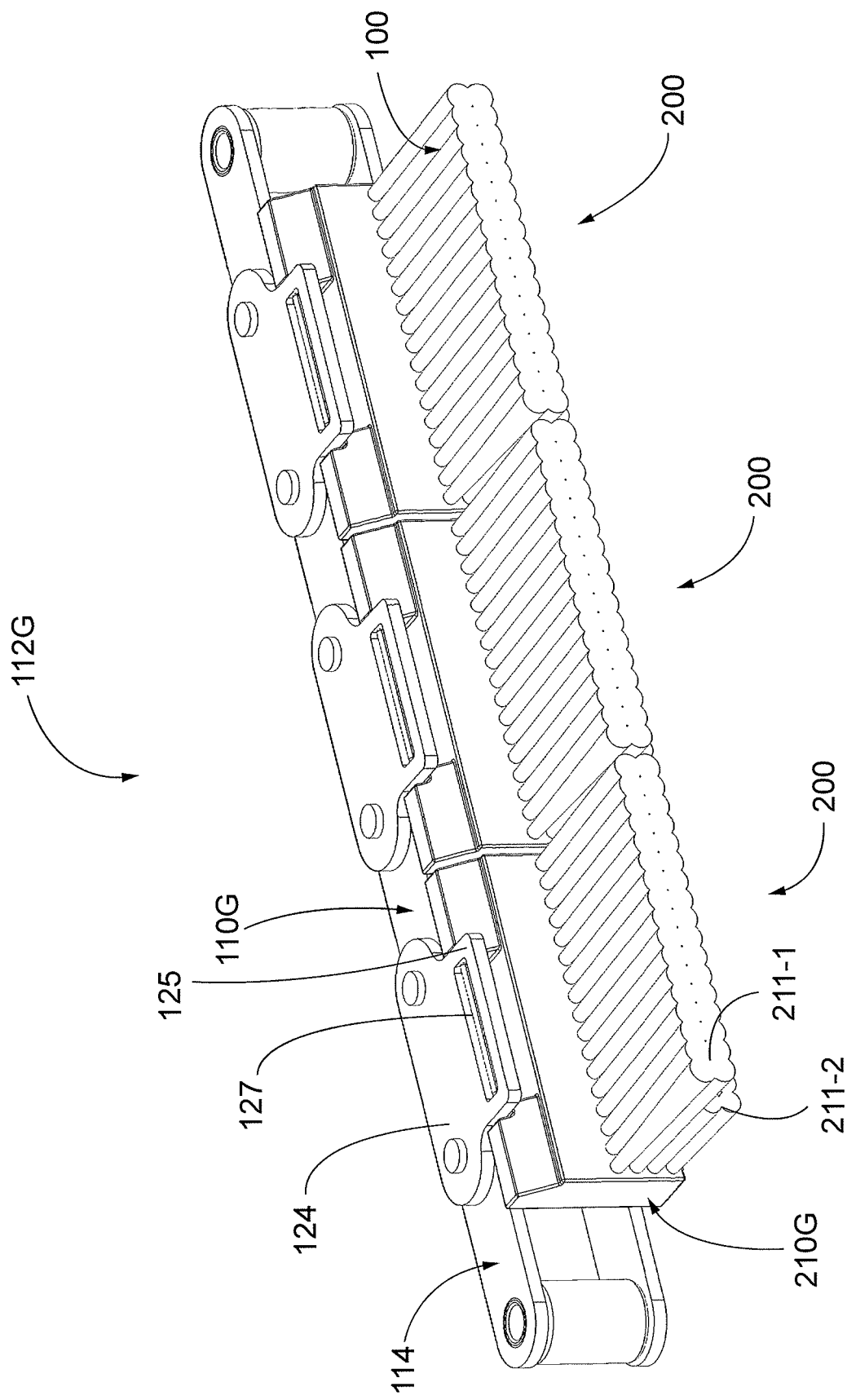
FIG. 23 is a perspective view of another embodiment of a segment of a gathering chain assembly in which the conveying surface includes bristles.

FIG. 23 illustrates another embodiment of a conveying surface 100 (only half of the conveying surface 100 is shown) comprising a gathering chain assembly 112G. In this embodiment, the gathering chain assembly 112G comprises a gathering chain 110G constructed of a plurality of individual links 114 joined together by link connecting plates 124, 126 as described in connection with the previous embodiments of the gathering chain 110A and 110E. As in the previous embodiment, the gathering chain 112G includes a plurality of bristle blocks 210G having a base 212G from which the bristles 211 extend. Although FIG. 23 shows only a segment of the gathering chain assembly 112G, it should be appreciated that the gathering chain assembly 112G comprises a continuous gathering chain 110G configured to be disposed around the drive sprocket 38 and idler sprocket 39 of the row unit 30, with the bristle blocks 210G disposed around the outer periphery of the gathering chain 110G as in all the other embodiments of the gathering chain assemblies 112A-112F previously described.

Figure 24:
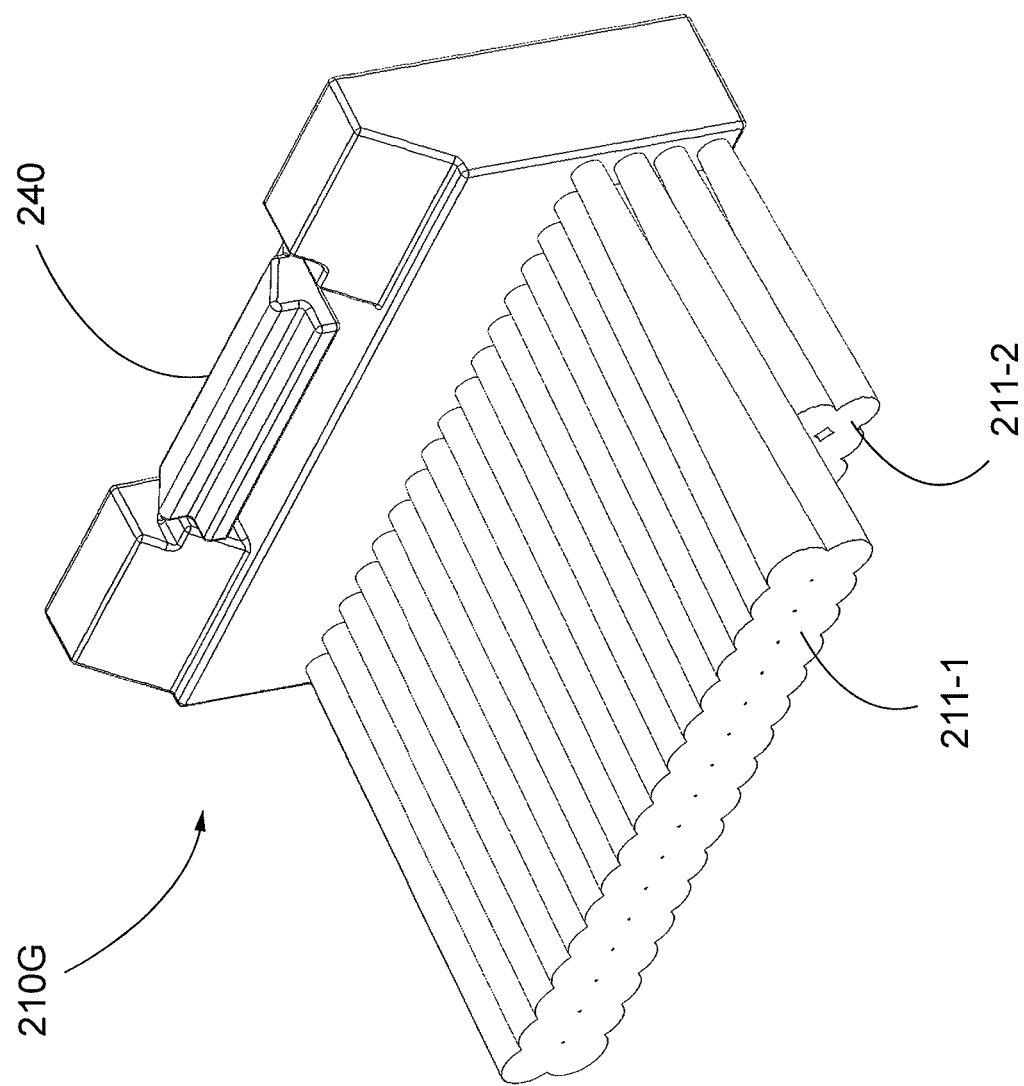
FIG. 24 is a front perspective view of a bristle block of the gathering chain assembly of FIG. 23.
Figure 25:
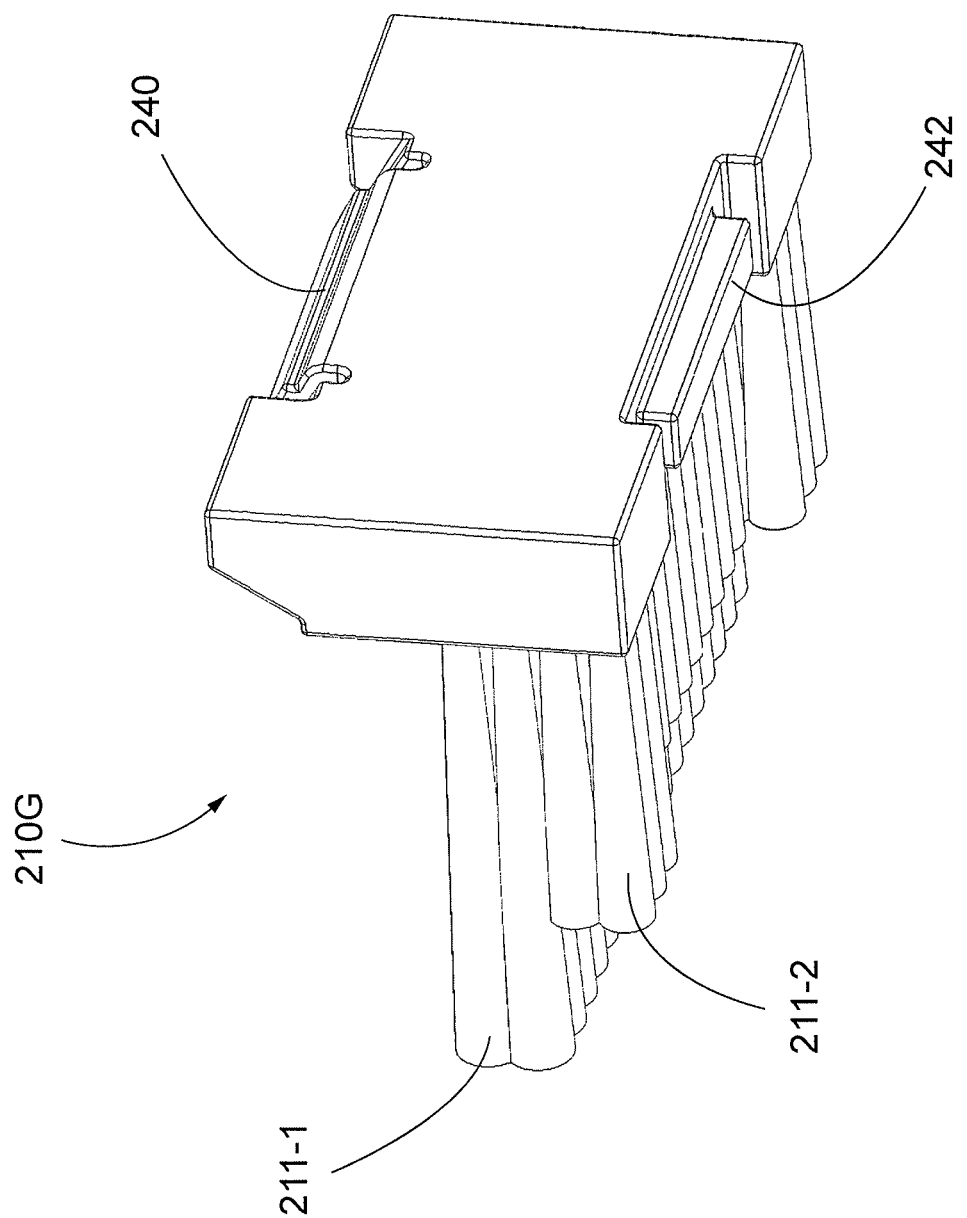
FIG. 25 is a rear perspective view of a bristle block of the gathering chain assembly of FIG. 23.

In this embodiment, the top and bottom link connectors 124, 126 include outwardly projecting flanges 125 with apertures 127 adapted to receive top and bottom tabs, respectively of the bristle block 210G. As shown in FIGS. 24-25, which are top and bottom perspective views, respectively of the bristle block 210G, a flexible top tab 240 is received within the aperture 127 of the top link connector 124 and the bottom tab 242 is received within the aperture 127 of the bottom link connector 126. To connect the bristle block 210G to the gathering chain 110G, the bottom tab 242 is positioned in the aperture 127 of the bottom link connector 126 and the top tab 240 is pushed inwardly causing the top tab 240 to deflect until it snaps into the aperture 127 of the top link connector 124.

In this embodiment, the bristle block 210G includes a top row of longer bristles 211-1 and a bottom row of shorter bristles 211-2. Alternatively, all the bristles 211-1, 211-2 may be of the same length. Additionally, the top row of bristles 211-1 may be elevated or offset from the bottom row of bristles 211-2 such that they extend further into the corn stalk slot. It can be appreciated that an opposing gathering chain assembly 112G on the other side of the row unit 30 may have bristle blocks 210 configured to be opposite the configuration of the opposing bristle blocks, i.e., a shorter top row of bristles 111-1 and longer bottom row of bristles 111-2, such that the opposing bristles overlap or interlock.

The specific number of bristle blocks 210 attached to the links 114 of gathering chain 110 and the interval at which they are attached to the gathering chain 110 and their orientation relative to one another or the gathering chain 110 may depend on the agronomic characteristics for the crop being harvested, such as the type of crop or the condition of the crop. Similarly, certain aspects of the bristles disposed on the block member may depend on the agronomic characteristics for the crop being harvested, such as the type of crop or the condition of the crop, including but not limited to: bristle count, bristle groups and group geometry, bristle thickness, position, length, orientation as well as the material composition of the bristle.

Various modifications to the embodiments and the general principles and features of the apparatus, systems and methods described herein will be readily apparent to those of skill in the art. Thus, the foregoing description is not to be limited to the embodiments of the apparatus, systems and methods described herein and illustrated in the drawing figures.

The invention claimed is:

1. A row unit of a row crop harvester head for harvesting row crops, the row unit comprising:
    first and second stripper plates, the first and second stripper plates laterally spaced to define a slot therebetween, the slot having a width and defining a longitudinal path of travel along which crop stalks pass as the row unit moves forwardly through a field harvesting the row crop;
    a first gathering chain defining a first continuous loop adapted to rotate above the first stripper plate, forwardly to rearwardly along a first side of the slot, the first gathering chain formed of chain links;
    a second gathering chain defining a second continuous loop adapted to rotate above the second stripper plate, forwardly to rearwardly along a second side of the slot, the second gathering chain formed of chain links;
    a first plurality of individual bristle blocks attached to the first gathering chain, each of the first plurality of individual bristle blocks including a base member, the base member having a front side, a back side, a leading end and a trailing end, the leading end and the trailing end defining a base member length, the base member having bristles extending laterally outward from the front side along the base member length, the back side of the base member removably yet rigidly attached to the first gathering chain, whereby each of the first plurality of individual bristle blocks is attached to the first gathering chain such that the leading end of one of the first plurality of individual bristle blocks is disposed in proximity to the trailing end of an adjacent one of the first plurality of individual bristle blocks so as to provide a first substantially continuous conveying surface of bristles above and along the first side of the slot;

a second plurality of individual bristle blocks attached to the second gathering chain, each of the second plurality of individual bristle blocks including a base member, the base member having a front side, a back side, a leading end and a trailing end, the leading end and the trailing end defining a base member length, the base member having bristles extending laterally outward from the front side along the base member length, the back side of the base member removably yet rigidly attached to the second gathering chain, whereby each of the second plurality of individual bristle blocks is attached to the second gathering chain such that the leading end of one of the second plurality of individual bristle blocks is disposed in proximity to the trailing end of an adjacent one of the second plurality of individual bristle blocks so as to provide a second substantially continuous conveying surface of bristles above and along the second side of the slot;

whereby the first and second substantially continuous conveying surfaces extend substantially across the width of the slot such that as the stalks of the row crop are pulled between the first and second conveying surfaces, the bristles capture and prevent loose kernels of the row crop being harvested from falling through the slot;

wherein the bristles of each of the first and second plurality of individual bristle blocks include upper bristles arranged in an upper row and lower bristles arranged in a lower row; and wherein the upper row of bristles are longer than the lower row of bristles.

2. A row unit of a row crop harvester head for harvesting row crops, the row unit comprising:

first and second stripper plates, the first and second stripper plates laterally spaced to define a slot therebetween, the slot having a width and defining a longitudinal path of travel along which crop stalks pass as the row unit moves forwardly through a field harvesting the row crop;

a first gathering chain defining a first continuous loop adapted to rotate above the first stripper plate, forwardly to rearwardly along a first side of the slot, the first gathering chain formed of chain links;

a second gathering chain defining a second continuous loop adapted to rotate above the second stripper plate, forwardly to rearwardly along a second side of the slot, the second gathering chain formed of chain links;

a first plurality of individual bristle blocks attached to the first gathering chain, each of the first plurality of individual bristle blocks including a base member, the base member having a front side, a back side, a leading end and a trailing end, the leading end and the trailing end defining a base member length, the base member having bristles extending laterally outward from the front side along the base member length, the back side of the base member removably yet rigidly attached to the first gathering chain, whereby each of the first plurality of individual bristle blocks is attached to the first gathering chain such that the leading end of one of the first plurality of individual bristle blocks is disposed in proximity to the trailing end of an adjacent one of the first plurality of individual bristle blocks so as to provide a first substantially continuous conveying surface of bristles above and along the first side of the slot;

a second plurality of individual bristle blocks attached to the second gathering chain, each of the second plurality of individual bristle blocks including a base member, the base member having a front side, a back side, a leading end and a trailing end, the leading end and the trailing end defining a base member length, the base member having bristles extending laterally outward from the front side along the base member length, the back side of the base member removably yet rigidly attached to the second gathering chain, whereby each of the second plurality of individual bristle blocks is attached to the second gathering chain such that the leading end of one of the second plurality of individual bristle blocks is disposed in proximity to the trailing end of an adjacent one of the second plurality of individual bristle blocks so as to provide a second substantially continuous conveying surface of bristles above and along the second side of the slot;

whereby the first and second substantially continuous conveying surfaces extend substantially across the width of the slot such that as the stalks of the row crop are pulled between the first and second conveying surfaces, the bristles capture and prevent loose kernels of the row crop being harvested from falling through the slot;

wherein the bristles of each of the first and second plurality of individual bristle blocks include upper bristles arranged in an upper row and lower bristles arranged in a lower row; and wherein the upper row of bristles are longer than the lower row of bristles on at least one of the first and second continuous loops, and wherein the upper row of bristles are shorter than the lower row of bristles on the other one of the first and second continuous loops such that distal ends of the longer bristles of the first and second continuous loops overlap one another as the first and second continuous loops move rearwardly along respective first and second sides of the slot.

3. A row unit of a row crop harvester head for harvesting row crops, the row unit comprising:

first and second stripper plates, the first and second stripper plates laterally spaced to define a slot therebetween, the slot having a width and defining a longitudinal path of travel along which crop stalks pass as the row unit moves forwardly through a field harvesting the row crop;

a first gathering chain defining a first continuous loop adapted to rotate above the first stripper plate, forwardly to rearwardly along a first side of the slot, the first gathering chain formed of chain links;

a second gathering chain defining a second continuous loop adapted to rotate above the second stripper plate, forwardly to rearwardly along a second side of the slot, the second gathering chain formed of chain links;

a first plurality of individual bristle blocks attached to the first gathering chain, each of the first plurality of individual bristle blocks including a base member, the base member having a front side, a back side, a leading end and a trailing end, the leading end and the trailing end defining a base member length, the base member having bristles extending laterally outward from the front side along the base member length, the back side of the base member removably yet rigidly attached to the first gathering chain, whereby each of the first plurality of individual bristle blocks is attached to the first gathering chain such that the leading end of one of the first plurality of individual bristle blocks is disposed in proximity to the trailing end of an adjacent one of the first plurality of individual bristle blocks so as to provide a first substantially continuous conveying surface of bristles above and along the first side of the slot;

a second plurality of individual bristle blocks attached to the second gathering chain, each of the second plurality of individual bristle blocks including a base member, the base member having a front side, a back side, a leading end and a trailing end, the leading end and the trailing end defining a base member length, the base member having bristles extending laterally outward from the front side along the base member length, the back side of the base member removably yet rigidly attached to the second gathering chain, whereby each of the second plurality of individual bristle blocks is attached to the second gathering chain such that the leading end of one of the second plurality of individual bristle blocks is disposed in proximity to the trailing end of an adjacent one of the second plurality of individual bristle blocks so as to provide a second substantially continuous conveying surface of bristles above and along the second side of the slot;

whereby the first and second substantially continuous conveying surfaces extend substantially across the width of the slot such that as the stalks of the row crop are pulled between the first and second conveying surfaces, the bristles capture and prevent loose kernels of the row crop being harvested from falling through the slot;

wherein the back side of the base of each of the first and second plurality of individual bristle blocks includes a cavity adapted to matingly receive one of a plurality of spaced mounting tabs extending from each of the first and second gathering chains.

4. The row unit of claim 3, wherein the cavity includes a resilient detent that engages with the mounting tab.

5. The row unit of claim 4, wherein the resilient detent includes a protrusion that is received in an aperture of the mounting tab.

6. A row unit of a row crop harvester head for harvesting row crops, the row unit comprising:

first and second stripper plates, the first and second stripper plates laterally spaced to define a slot therebetween, the slot having a width and defining a longitudinal path of travel along which crop stalks pass as the row unit moves forwardly through a field harvesting the row crop;

a first gathering chain defining a first continuous loop adapted to rotate above the first stripper plate, forwardly to rearwardly along a first side of the slot, the first gathering chain formed of chain links;

a second gathering chain defining a second continuous loop adapted to rotate above the second stripper plate, forwardly to rearwardly along a second side of the slot, the second gathering chain formed of chain links;

a first plurality of individual bristle blocks attached to the first gathering chain, each of the first plurality of individual bristle blocks including a base member, the base member having a front side, a back side, a leading end and a trailing end, the leading end and the trailing end defining a base member length, the base member having bristles extending laterally outward from the front side along the base member length, the back side of the base member removably yet rigidly attached to the first gathering chain, whereby each of the first plurality of individual bristle blocks is attached to the first gathering chain such that the leading end of one of the first plurality of individual bristle blocks is disposed in proximity to the trailing end of an adjacent one of the first plurality of individual bristle blocks so as to provide a first substantially continuous conveying surface of bristles above and along the first side of the slot;

a second plurality of individual bristle blocks attached to the second gathering chain, each of the second plurality of individual bristle blocks including a base member, the base member having a front side, a back side, a leading end and a trailing end, the leading end and the trailing end defining a base member length, the base member having bristles extending laterally outward from the front side along the base member length, the back side of the base member removably yet rigidly attached to the second gathering chain, whereby each of the second plurality of individual bristle blocks is attached to the second gathering chain such that the leading end of one of the second plurality of individual bristle blocks is disposed in proximity to the trailing end of an adjacent one of the second plurality of individual bristle blocks so as to provide a second substantially continuous conveying surface of bristles above and along the second side of the slot;

whereby the first and second substantially continuous conveying surfaces extend substantially across the width of the slot such that as the stalks of the row crop are pulled between the first and second conveying surfaces, the bristles capture and prevent loose kernels of the row crop being harvested from falling through the slot;

wherein the base of each of the first and second plurality of individual bristle blocks is attached by a fastener to one of a plurality of spaced mounting tabs extending from each of the first and second gathering chains.

7. A row unit of a row crop harvester head for harvesting row crops, the row unit comprising:

first and second stripper plates, the first and second stripper plates laterally spaced to define a slot therebetween, the slot having a width and defining a longitudinal path of travel along which crop stalks pass as the row unit moves forwardly through a field harvesting the row crop;

a first gathering chain defining a first continuous loop adapted to rotate above the first stripper plate, forwardly to rearwardly along a first side of the slot, the first gathering chain formed of chain links;

a second gathering chain defining a second continuous loop adapted to rotate above the second stripper plate, forwardly to rearwardly along a second side of the slot, the second gathering chain formed of chain links;

a first plurality of individual bristle blocks attached to the first gathering chain, each of the first plurality of individual bristle blocks including a base member, the base member having a front side, a back side, a leading end and a trailing end, the leading end and the trailing end defining a base member length, the base member having bristles extending laterally outward from the front side along the base member length, the back side of the base member removably yet rigidly attached to the first gathering chain, whereby each of the first plurality of individual bristle blocks is attached to the first gathering chain such that the leading end of one of the first plurality of individual bristle blocks is disposed in proximity to the trailing end of an adjacent one of the first plurality of individual bristle blocks so as to provide a first substantially continuous conveying surface of bristles above and along the first side of the slot;

a second plurality of individual bristle blocks attached to the second gathering chain, each of the second plurality of individual bristle blocks including a base member, the base member having a front side, a back side, a leading end and a trailing end, the leading end and the trailing end defining a base member length, the base member having bristles extending laterally outward from the front side along the base member length, the back side of the base member removably yet rigidly attached to the second gathering chain, whereby each of the second plurality of individual bristle blocks is attached to the second gathering chain such that the leading end of one of the second plurality of individual bristle blocks is disposed in proximity to the trailing end of an adjacent one of the second plurality of individual bristle blocks so as to provide a second substantially continuous conveying surface of bristles above and along the second side of the slot;

whereby the first and second substantially continuous conveying surfaces extend substantially across the width of the slot such that as the stalks of the row crop are pulled between the first and second conveying surfaces, the bristles capture and prevent loose kernels of the row crop being harvested from falling through the slot;

wherein the base of each of the first and second plurality of individual bristle blocks includes a top tab and a bottom tab, and wherein each of the first and second gathering chains includes a plurality of spaced top link connectors and a plurality of spaced bottom link connectors, each of the top link connectors and bottom link connectors having an aperture, whereby the top tab is received in the aperture of one of the top link connectors and the bottom tab is received in the aperture of one of the bottom link connectors.

* * * * *